US012555534B2

(12) United States Patent
Liao et al.

(10) Patent No.: US 12,555,534 B2
(45) Date of Patent: Feb. 17, 2026

(54) PIXEL CIRCUIT AND DRIVING METHOD THEREFOR, AND DISPLAY DEVICE

(71) Applicant: CHENGDU VISTAR OPTOELECTRONICS CO., LTD., Sichuan (CN)

(72) Inventors: Yisui Liao, Chengdu (CN); Xiuqi Huang, Chengdu (CN); Shangjun Xu, Chengdu (CN)

(73) Assignee: CHENGDU VISTAR OPTOELECTRONICS CO., LTD., Chengdu (CN)

( * ) Notice: Subject to any disclaimer, the term of this patent is extended or adjusted under 35 U.S.C. 154(b) by 0 days.

(21) Appl. No.: 18/916,931

(22) Filed: Oct. 16, 2024

(65) Prior Publication Data

US 2025/0037660 A1 Jan. 30, 2025

Related U.S. Application Data

(63) Continuation of application No. PCT/CN2023/091626, filed on Apr. 28, 2023.

(30) Foreign Application Priority Data

May 30, 2022 (CN) ......................... 202210602213.6
May 30, 2022 (CN) ......................... 202210605275.2

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01);
(Continued)

(58) Field of Classification Search
CPC ............... G09G 3/3233; G09G 3/2007; G09G 2300/0819; G09G 2300/0852; G09G 2300/0861; G09G 2310/08
See application file for complete search history.

(56) References Cited

U.S. PATENT DOCUMENTS 11,688,331 B2 * 6/2023 Hwang ................ G09G 3/2081 345/204
11,955,057 B2 * 4/2024 Kim ..................... G09G 3/2003
(Continued)

FOREIGN PATENT DOCUMENTS

CN 107393470 A 11/2017
CN 104700783 B 9/2018
(Continued)

OTHER PUBLICATIONS

Office Action issued Apr. 8, 2024, in corresponding Taiwanese Application No. 112119780, 22 pages.
(Continued)

*Primary Examiner* — David Tung
(74) *Attorney, Agent, or Firm* — Maier & Maier, PLLC

(57) ABSTRACT

A pixel circuit, a driving method therefor and a display device. The pixel circuit includes a voltage control circuit, a current control circuit and a light-emitting circuit. The voltage control circuit includes a first driving circuit, a coupling circuit and a first voltage write circuit. The coupling circuit is configured to couple a reset signal to a control terminal of the first driving circuit to reset a voltage of a control terminal of the current control circuit; or the voltage control circuit further includes a reset circuit, where the reset circuit is connected between a first power line and a control terminal of the current control circuit and configured to reset a voltage of the control terminal of the current control circuit.

20 Claims, 28 Drawing Sheets

(52) U.S. Cl.
CPC ............... *G09G 2300/0852* (2013.01); *G09G 2300/0861* (2013.01); *G09G 2310/08* (2013.01)

(56) References Cited

U.S. PATENT DOCUMENTS

| | | | | |
|---|---|---|---|---|
| 12,046,185 | B2 * | 7/2024 | Kim | G11C 19/28 |
| 12,142,194 | B2 * | 11/2024 | Kim | G06F 3/147 |
| 2008/0111191 | A1 * | 5/2008 | Miyazawa | G09G 3/3233 257/355 |
| 2013/0127812 | A1 * | 5/2013 | Abe | G09G 3/3283 345/76 |
| 2013/0194248 | A1 | 8/2013 | Kim | |
| 2021/0210002 | A1 * | 7/2021 | Kim | G09G 3/32 |
| 2021/0210003 | A1 * | 7/2021 | Kim | G09G 3/2014 |
| 2022/0101783 | A1 | 3/2022 | Han et al. | |
| 2022/0114949 | A1 | 4/2022 | Xuan et al. | |
| 2022/0114951 | A1 * | 4/2022 | Chang | G09G 3/32 |
| 2022/0319397 | A1 * | 10/2022 | Kim | G09G 3/2003 |
| 2023/0154372 | A1 * | 5/2023 | Hwang | G09G 3/2011 345/691 |

FOREIGN PATENT DOCUMENTS

| | | | |
|---|---|---|---|
| CN | 111009210 | A | 4/2020 |
| CN | 111128069 | A | 5/2020 |
| CN | 111489687 | A | 8/2020 |
| CN | 112509523 | A | 3/2021 |
| CN | 112735329 | A | 4/2021 |
| CN | 113299230 | A | 8/2021 |
| CN | 113362765 | A | 9/2021 |
| CN | 113707077 | A | 11/2021 |
| CN | 113990243 | A | 1/2022 |
| CN | 114299864 | A | 4/2022 |
| CN | 114495822 | A | 5/2022 |
| CN | 115841800 | A | 3/2023 |
| JP | 2013044847 | A | 3/2013 |
| JP | 2013054161 | A | 3/2013 |
| KR | 102362145 | B1 | 2/2022 |
| TW | 202211190 | A | 3/2022 |

OTHER PUBLICATIONS

International Search Report issued Aug. 5, 2023, in corresponding International Application No. PCT/CN2023/091626; 6 pages.
Search Report issued on Jun. 13, 2025, in corresponding Chinese Application No. 202210602213.6, 8 pages.
Office Action issued on Dec. 15, 2025, in corresponding Chinese Application No. 202210605275.2, 16 pages.

* cited by examiner

PIXEL CIRCUIT AND DRIVING METHOD THEREFOR, AND DISPLAY DEVICE

CROSS-REFERENCE TO RELATED APPLICATION

This is a continuation of International Patent Application No. PCT/CN2023/091626, filed on Apr. 28, 2023, which is based on and claims priority to Chinese Patent Application No. 202210605275.2 and Chinese Patent Application No. 202210602213.6 filed with the China National Intellectual Property Administration (CNIPA) on May 30, 2022, disclosures of which are incorporated herein by reference in their entireties.

TECHNICAL FIELD

The present application relates to the field of display technology, for example, a pixel circuit, a driving method therefor and a display device.

BACKGROUND

With the ongoing development of display technology, increasingly high requirements are imposed on the display effects of display devices.

A display device generally includes a pixel circuit and a light-emitting element. The pixel circuit generally controls, in an analog pulse-width modulation (PWM) mode, the light-emitting element to emit light. However, in the related art, the pixel circuit involves many types of signals and has a complex circuit structure, making it impossible to achieve high pixels per inch (PPI).

SUMMARY

The present application provides a pixel circuit, a driving method therefor and a display device to simplify the structure of a pixel circuit and increase the PPI.

The present application provides a pixel circuit. The pixel circuit includes a voltage control circuit, a current control circuit and a light-emitting circuit. The voltage control circuit includes a first driving circuit, a coupling circuit and a first voltage write circuit, where the first voltage write circuit is configured to transmit a voltage at a fixed level to a control terminal of the first driving circuit, the coupling circuit is configured to couple a first data voltage and a sweep signal to the control terminal of the first driving circuit, the first driving circuit is connected between a first power line and a control terminal of the current control circuit, a voltage transmitted by the first power line is a jump voltage, and the first driving circuit is configured to control a voltage of the control terminal of the current control circuit according to the first data voltage and the sweep signal to control a light emission time of a light-emitting circuit. The current control circuit and the light-emitting circuit are connected between a second power line and a third power line, and the current control circuit is configured to drive the light-emitting circuit to emit light. The voltage control circuit further includes a reset circuit, and the reset circuit is connected between the first power line and the control terminal of the current control circuit and configured to reset the voltage of the control terminal of the current control circuit; or the coupling circuit is further configured to couple a reset signal to the control terminal of the first driving circuit to reset the voltage of the control terminal of the current control circuit.

The present application further provides a driving method for a pixel circuit. The pixel circuit includes a voltage control circuit, a current control circuit and a light-emitting circuit. The voltage control circuit includes a first driving circuit, a coupling circuit and a first voltage write circuit; or the voltage control circuit includes a first driving circuit, a coupling circuit, a first voltage write circuit and a reset circuit, where the reset circuit is connected between a first power line and a control terminal of the current control circuit. The coupling circuit and the first voltage write circuit are connected to a control terminal of the first driving circuit. The first driving circuit is connected between the first power line and the control terminal of the current control circuit. A voltage transmitted by the first power line is a jump voltage. The current control circuit and the light-emitting circuit are connected between a second power line and a third power line.

The driving method for the pixel circuit includes: in a voltage write stage, controlling the first voltage write circuit to write a voltage at a fixed level to the control terminal of the first driving circuit and controlling a first data voltage to be written to the coupling circuit; in a reset stage, controlling the voltage transmitted by the first power line to jump and controlling the reset circuit to reset a voltage of the control terminal of the current control circuit, or controlling the voltage transmitted by the first power line to jump and controlling the coupling circuit to couple a reset signal to the control terminal of the first driving circuit to reset a voltage of the control terminal of the current control circuit; in a voltage normalization stage, controlling a sweep signal to be written to the coupling circuit so that the coupling circuit couples the first data voltage to the control terminal of the first driving circuit; and in a light emission stage, controlling the current control circuit to drive the light-emitting circuit to emit light and controlling a voltage of the control terminal of the first driving circuit and the voltage of the control terminal of the current control circuit through the sweep signal and the first data voltage to control a light emission time of the light-emitting circuit.

The present application further provides a display device including the pixel circuit according to any embodiment of the present application.

BRIEF DESCRIPTION OF DRAWINGS

The drawings used in the description of embodiments are briefly described below.

DETAILED DESCRIPTION

The technical solutions in embodiments of the present application are described below in conjunction with the drawings in the embodiments of the present application.

It is to be noted that terms such as "first" and "second" in the description, claims and drawings of the present application are used to distinguish between similar objects and are not necessarily used to describe a particular order or sequence. It is to be understood that data used in this manner are interchangeable where appropriate so that the embodiments of the present application described herein can be implemented in an order not illustrated or described herein. Additionally, terms "including" and "having" and any variations thereof are intended to encompass a non-exclusive inclusion. For example, a process, method, system, product or device that includes a series of steps or circuits includes not only the expressly listed steps or circuits but may also include other steps or circuits that are not expressly listed or are inherent to such process, method, system, product or device.

Figure 1:
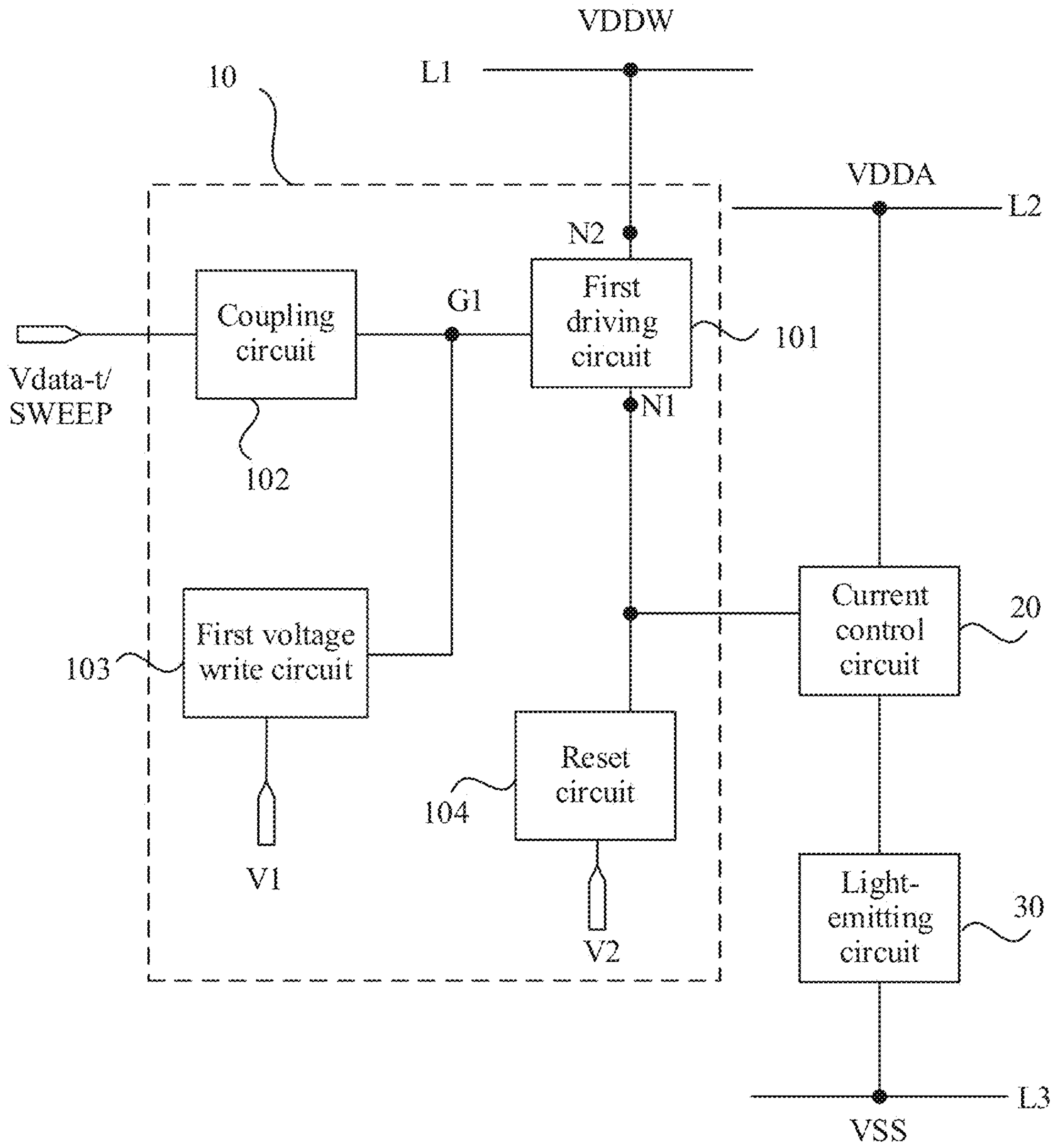
FIG. 1 is a structure diagram of a pixel circuit according to an embodiment of the present application.

FIG. 1 is a structure diagram of a pixel circuit according to an embodiment of the present application. Referring to FIG. 1, the pixel circuit provided in this embodiment includes a voltage control circuit 10, a current control circuit 20 and a light-emitting circuit 30. The voltage control circuit 10 includes a first driving circuit 101, a coupling circuit 102, a first voltage write circuit 103 and a reset circuit 104. The first voltage write circuit 103 is configured to transmit a voltage at a fixed level to a control terminal G1 of the first driving circuit 101. The coupling circuit 102 is configured to couple a first data voltage Vdata_t and a sweep signal SWEEP to the control terminal G1 of the first driving circuit 101. The first driving circuit 101 is connected between a first power line L1 and a control terminal of the current control circuit 20. The first driving circuit 101 is configured to control a voltage of the control terminal of the current control circuit 20 according to the first data voltage Vdata_t and the sweep signal SWEEP to control a light emission time of the light-emitting circuit 30. The current control circuit 20 and the light-emitting circuit 30 are connected between a second power line L2 and a third power line L3. The reset circuit 104 is configured to reset the voltage of the control terminal of the current control circuit 20.

For example, the current control circuit 20 and the light-emitting circuit 30 are connected between the second power line L2 and the third power line L3, the second power line L2 is configured to transmit a second power voltage VDDA, and the third power line L3 is configured to transmit a third power voltage VSS. When a discharge path between the second power line L2 and the third power line L3 is turned on, the current control circuit 20 can generate a driving current to drive the light-emitting circuit 30 to emit light. A first terminal N1 of the first driving circuit 101 is connected to the control terminal of the current control circuit 20 and a second terminal N2 of the first driving circuit 101 is connected to a voltage transmitted by the first power line L1. The first driving circuit 101 controls a voltage of the first terminal N1 of the first driving circuit 101 according to the first data voltage Vdata_t and the sweep signal SWEEP written to the control terminal G1 of the first driving circuit 101 to control the voltage of the control terminal of the current control circuit 20. The current control circuit 20 controls an on state of the discharge path between the second power line L2 and the third power line L3 according to the voltage of the control terminal of the current control circuit 20 to control the light emission time of the light-emitting circuit 30.

The reset circuit 104 may be connected to a second voltage V2 to reset a potential of the control terminal of the current control circuit 20 through the second voltage V2. In this embodiment, the second voltage V2 may be provided by a power line. For example, the second voltage V2 may be a voltage provided by the first power line L1 or a voltage at a fixed level and provided by another power line.

In this embodiment, since the first data voltage Vdata_t is written to a first terminal of the coupling circuit 102 and a second terminal of the coupling circuit 102 maintains a constant voltage (which may be a fixed voltage, a first voltage V1, written by the first voltage write circuit 103 or may be another voltage that can make the first driving circuit 101 off), a voltage difference exists between the first terminal of the coupling circuit 102 and the second terminal of the coupling circuit 102. When signal scanning is performed through the sweep signal SWEEP, a voltage of the first terminal of the coupling circuit 102 changes from the first data voltage Vdata_t to the sweep signal SWEEP, and under the coupling of the coupling circuit 102, a voltage variation of the first terminal of the coupling circuit 102 is coupled to the second terminal of the coupling circuit 102 (the voltage after coupling does not make the first driving circuit 101 on). Therefore, the voltage of the second terminal of the coupling circuit 102 is associated with the first data voltage Vdata_t.

That is, the first data voltage Vdata_t is written to the control terminal G1 of the first driving circuit 101. Since the first data voltage Vdata_t is written to the control terminal G1 of the first driving circuit 101 through the coupling circuit 102, no requirement is imposed on a magnitude of a first power voltage VDDW transmitted by the first power line L1 connected to the second terminal N2 of the first driving circuit 101. Therefore, after the first data voltage Vdata_t is written to the control terminal G1 of the first driving circuit 101, the first driving circuit 101 is still in an off state and does not affect the voltage of the first terminal N1 of the first driving circuit 101. Thus, when an on state of the first driving circuit 101 is controlled, the magnitude of the first power voltage VDDW does not need to be set according to the first data voltage Vdata_t. In other words, the first power voltage VDDW does not need to vary with the first data voltage Vdata_t, facilitating a decrease in a voltage difference between voltages of a pixel (where the voltage difference refers to a voltage difference between a maximum value and a minimum value of other voltage signals than the data voltage in the pixel circuit), so that multiple devices are subjected to a relatively small bias voltage and the reliability of the pixel circuit can be improved.

Figure 2:
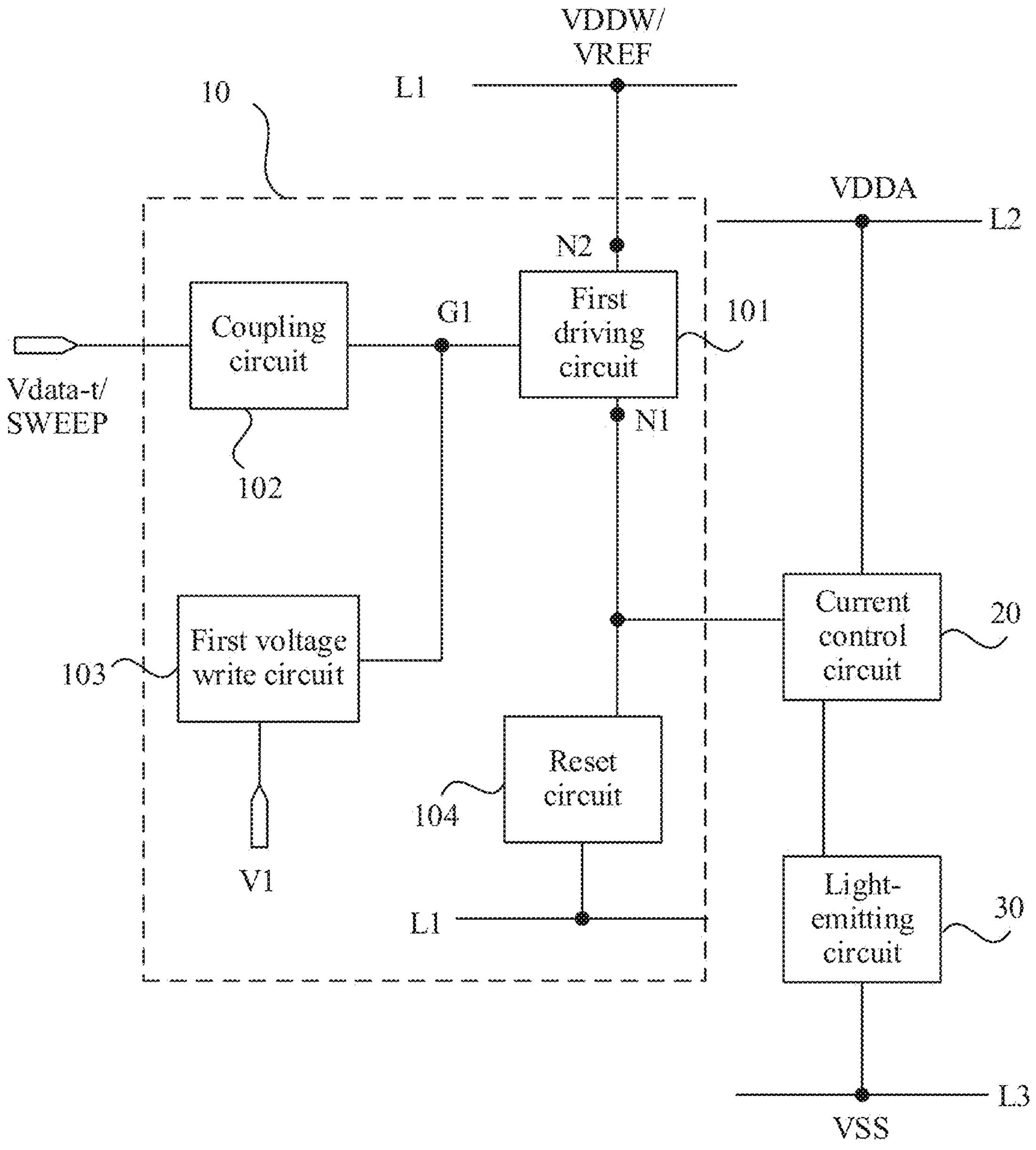
FIG. 2 is another structure diagram of a pixel circuit according to an embodiment of the present application.

FIG. 2 is another structure diagram of a pixel circuit according to an embodiment of the present application. Referring to FIG. 2, based on the preceding technical solutions, optionally, in this embodiment, the voltage transmitted by the first power line L1 is a jump voltage. For example, in this embodiment, the first power line L1 may be configured to transmit a voltage that jumps from the first power voltage VDDW to a reset voltage VREF at least in a reset stage and jumps from the reset voltage VREF to the first power voltage VDDW after the reset stage.

The voltage transmitted by the first power line L1 is different from the voltage transmitted by the second power line L2. In this embodiment, the second power voltage VDDA transmitted by the second power line L2 is a fixed voltage, and the second power voltage VDDA is provided for the current control circuit 20 as a power voltage. The reset circuit 104 may be connected to the first power line L1. In the reset stage, the voltage transmitted by the first power line L1 is the reset voltage VREF. The reset voltage VREF is the second voltage V2. The reset voltage VREF is transmitted by the reset circuit 104 to the control terminal of the current control circuit 20 to implement the function of resetting the voltage of the control terminal of the current control circuit 20. After the reset stage, the voltage transmitted by the first power line L1 jumps to the first power voltage VDDW. That is, the first power line L1 transmits different voltages in different stages to implement different functions of the pixel circuit so that the number of signal lines can be reduced, thereby facilitating the simplification of the circuit structure, saving layout space, and achieving high PPI. The first power voltage VDDW and the reset voltage VREF are two voltages of different magnitudes.

Optionally, a minimum voltage of the reset voltage VREF is lower than a minimum voltage of the first data voltage Vdata_t.

In the pixel circuit according to the embodiment of the present application, in one aspect, the voltages transmitted by the first power line and the second power line are distinguished from each other, and the voltage transmitted by the first power line is configured to be the jump voltage. For example, the first power line is configured to transmit the reset voltage in the reset stage and transmit the first power voltage after the reset stage so that the number of power lines can be reduced, which is conducive to saving the layout space and increasing the PPI. In another aspect, the first data voltage is indirectly written to the control terminal of the first driving circuit through the coupling circuit so that the on state of the first driving circuit does not need to be set according to a magnitude of the first data voltage, and no requirement is imposed on the magnitudes of the first data voltage and the power voltage (such as the first power voltage) connected to the second terminal of the first driving circuit. The first power voltage can be flexibly set so that the voltage difference between voltages of the pixel can be reduced, and the devices are subjected to a smaller bias voltage, facilitating the improvement of the reliability of the pixel circuit.

Figure 3:
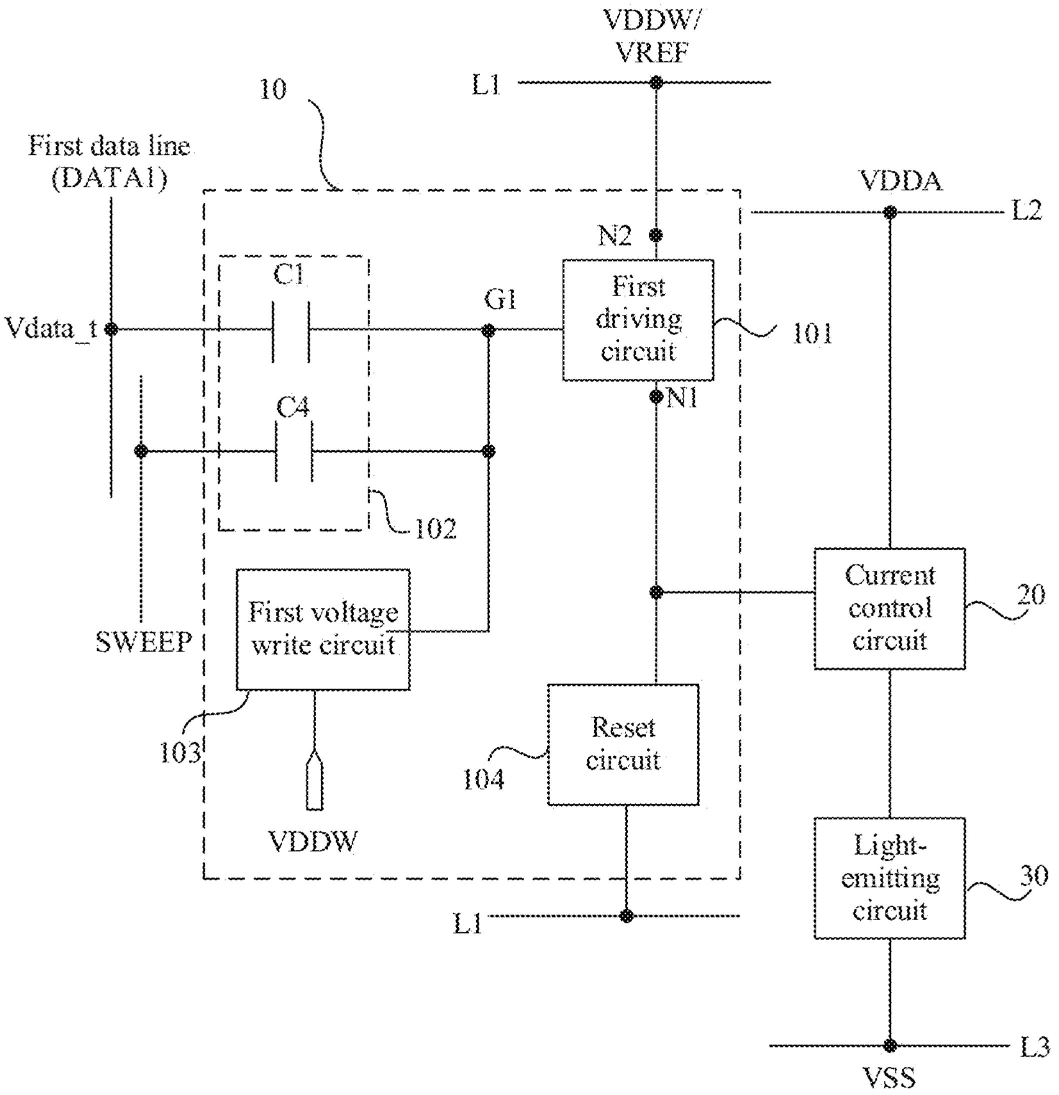
FIG. 3 is another structure diagram of a pixel circuit according to an embodiment of the present application.

FIG. 3 is another structure diagram of a pixel circuit according to an embodiment of the present application. Referring to FIG. 3, based on the preceding embodiments, a first terminal of the first voltage write circuit 103 is connected to the first power line L1, a second terminal of the first voltage write circuit 103 is connected to the control terminal G1 of the first driving circuit 101, and the first voltage write circuit 103 is configured to write the first power voltage VDDW to the control terminal G1 of the first driving circuit 101 in a voltage write stage.

For example, the fixed voltage V1 transmitted by the first voltage write circuit 103 to the control terminal G1 of the first driving circuit 101 may be the first power voltage VDDW transmitted by the first power line L1. In a voltage write stage, the first power line L1 transmits the first power voltage VDDW, the first voltage write circuit 103 is turned on to transmit the first power voltage VDDW to the control terminal G1 of the first driving circuit 101, and the first driving circuit 101 is in the off state. Moreover, the first data voltage Vdata_t is written to the first terminal of the coupling circuit 102, and the voltage difference between the first terminal of the coupling circuit 102 and the second terminal of the coupling circuit 102 is VDDW−Vdata_t.

Still referring to FIG. 3, the coupling circuit 102 includes a first capacitor C1 and a fourth capacitor C4, the first capacitor C1 is connected between a first data line DATA1 and the control terminal G1 of the first driving circuit 101, and the fourth capacitor C4 is connected between a sweep signal line and the control terminal G1 of the first driving circuit 101. In the voltage write stage, the first power voltage VDDW is written to the control terminal G1 of the first driving circuit 101 through the first voltage write circuit 103, and the first data voltage Vdata_t transmitted by the first data line DATA1 is written to a first terminal of the first capacitor C1, and a voltage difference between the first terminal of the first capacitor C1 and a second terminal of the first capacitor C1 is VDDW−Vdata_t. In a voltage normalization stage, the voltage on the first data line DATA1 changes, and under the coupling of the first capacitor C1, the first data voltage Vdata_t is written to the control terminal G1 of the first driving circuit 101. In a light emission stage, under the coupling of the fourth capacitor C4, the voltage of the control terminal G1 of the first driving circuit 101 is adjusted through the sweep signal SWEEP transmitted by the sweep signal line, and the first driving circuit 101 controls the voltage of the control terminal of the current control circuit 20 according to the voltage of the control terminal G1 of the first driving circuit 101 to control the light emission time of the light-emitting circuit 30.

Figure 4:
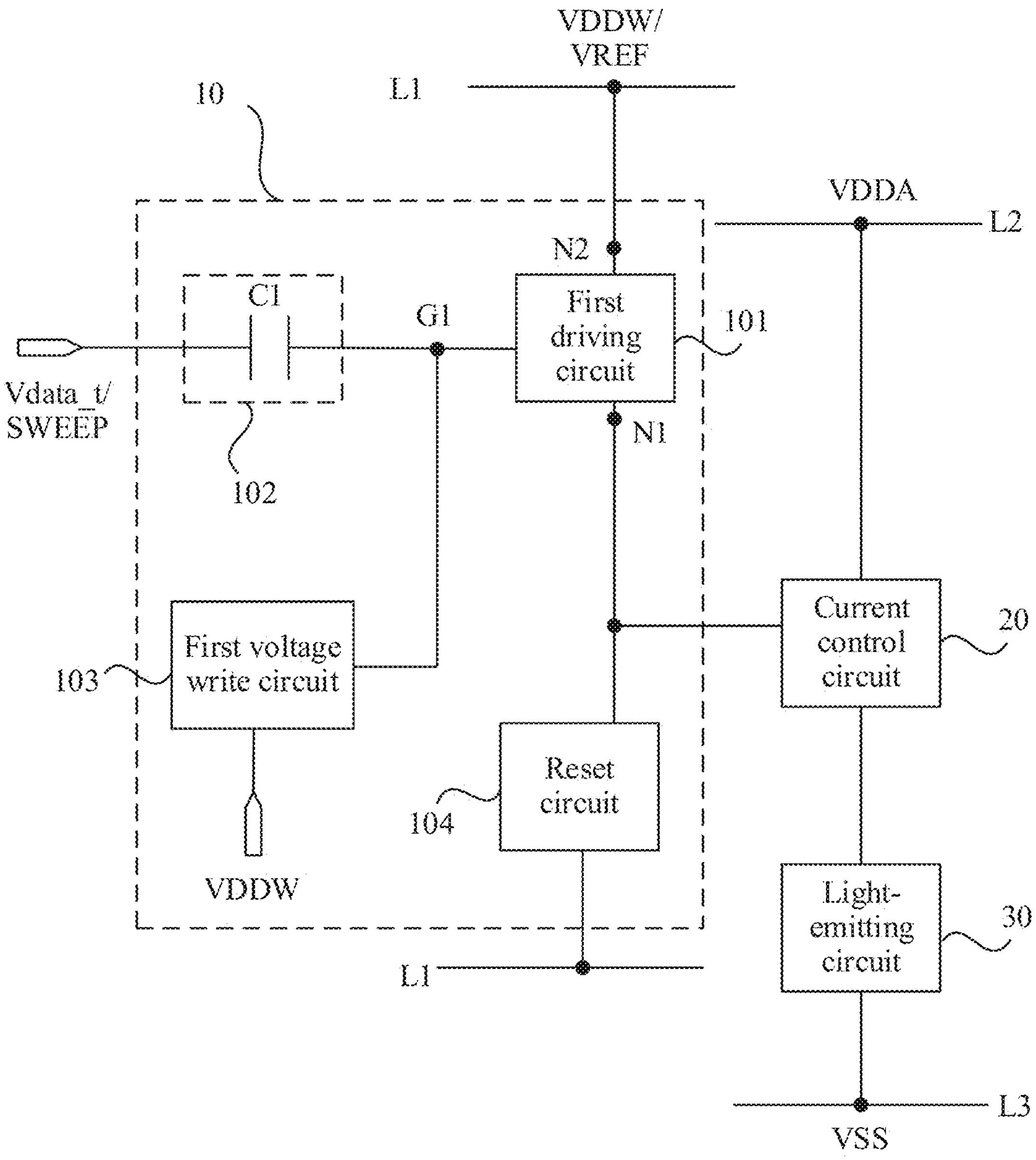
FIG. 4 is another structure diagram of a pixel circuit according to an embodiment of the present application.

In an optional implementation of this embodiment, to further reduce the number of signal lines, the first data voltage Vdata_t and the sweep signal SWEEP may be transmitted by the same signal line. FIG. 4 is another structure diagram of a pixel circuit according to an embodiment of the present application. Referring to FIG. 4, the coupling circuit includes the first capacitor, the first terminal of the first capacitor C1 serves as the first terminal of the coupling circuit 102 and is connected to the first data line DATA1, the second terminal of the first capacitor C1 serves as the second terminal of the coupling circuit 102 and is connected to the control terminal G1 of the first driving circuit 101, and the first data voltage Vdata_t and the sweep signal SWEEP share the first data line DATA1. In this manner, the number of sweep signal lines and the number of capacitors can be reduced, facilitating the further reduction of the occupied layout space and achieving the high PPI. A specific operating process of the coupling circuit 102 is described in the subsequent embodiments.

In this embodiment, no matter whether the first data voltage Vdata_t and the sweep signal SWEEP share the same data line or use respective data lines, a switch element for switching between the first data voltage Vdata_t and the sweep signal SWEEP is not needed, facilitating the simplification of the circuit structure and the reduction of a system cost.

Figure 5:
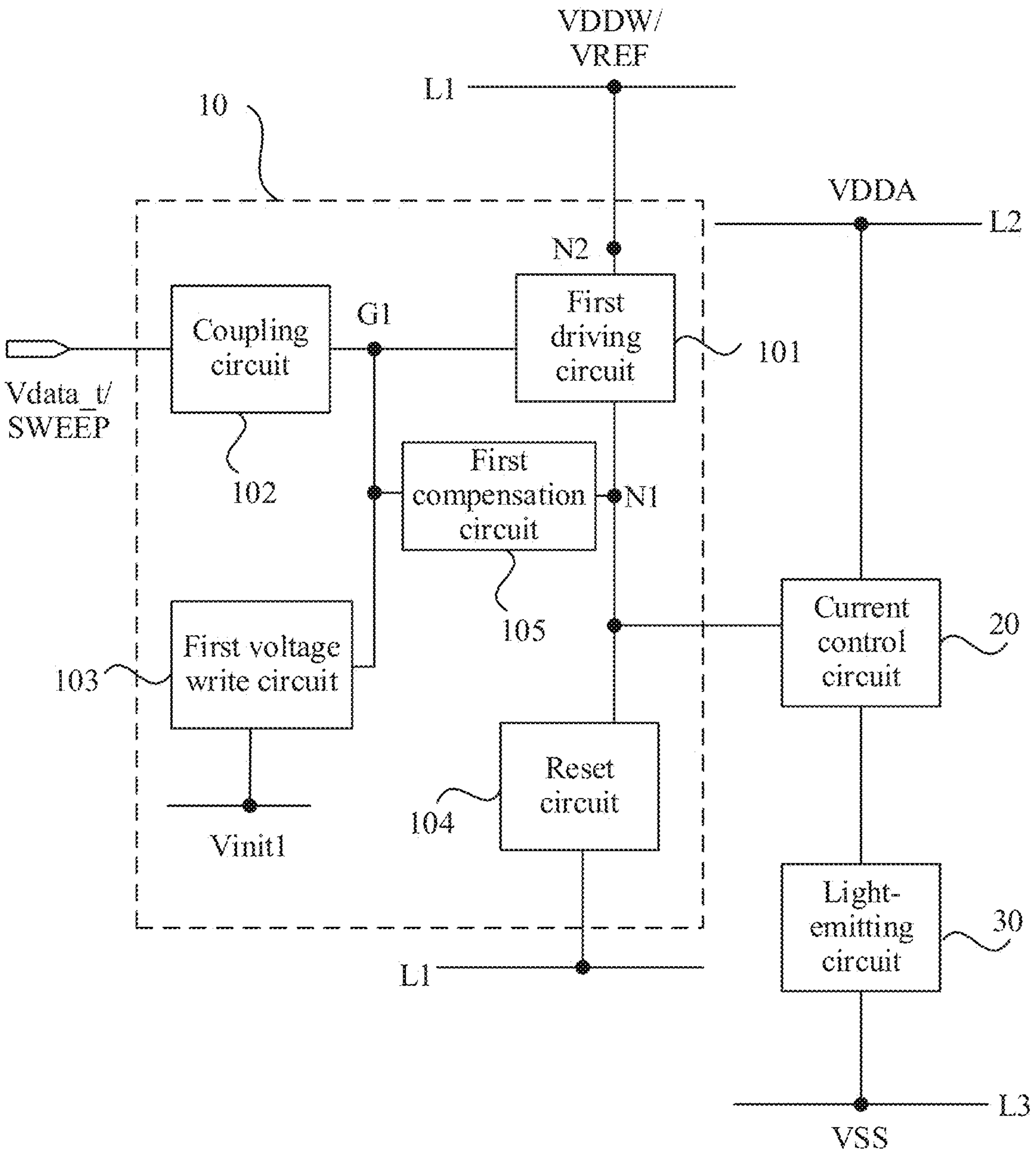
FIG. 5 is another structure diagram of a pixel circuit according to an embodiment of the present application.
Figure 6:
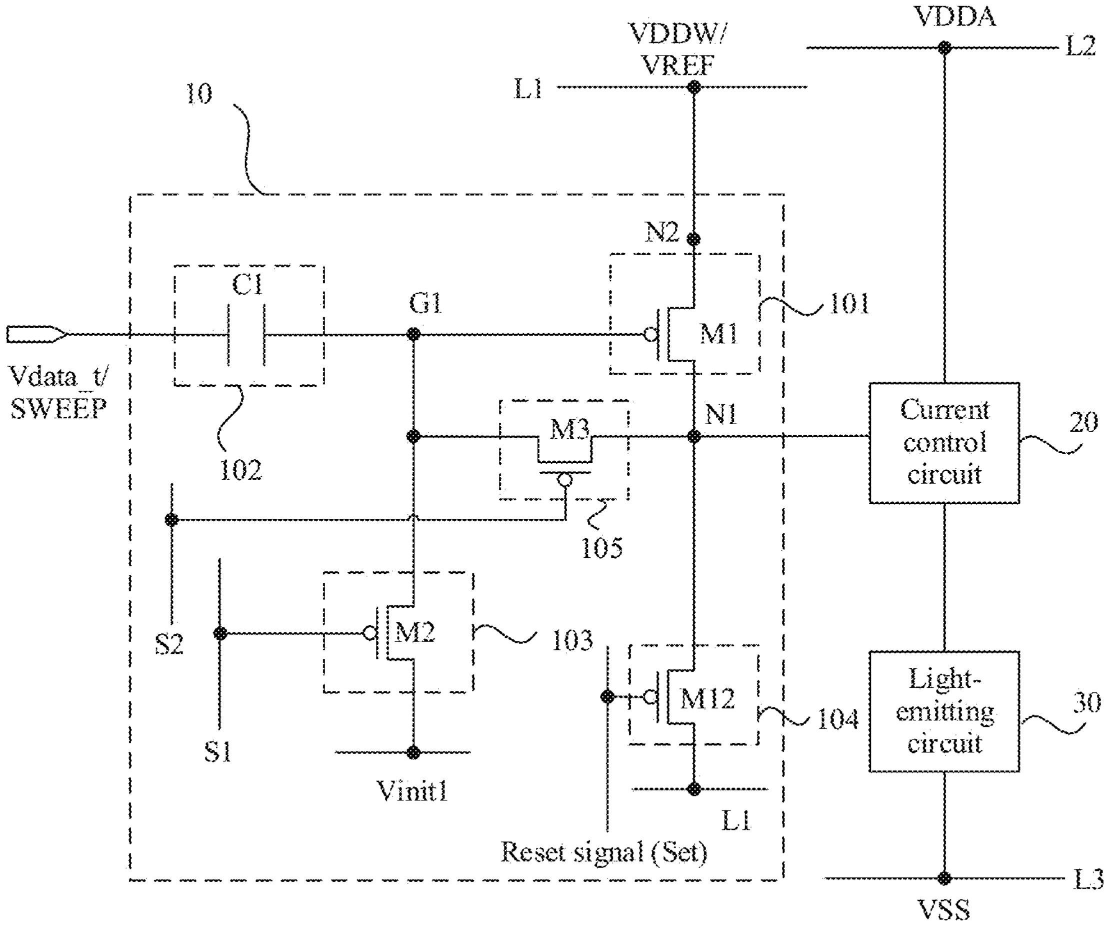
FIG. 6 is another structure diagram of a pixel circuit according to an embodiment of the present application.

FIG. 5 is another structure diagram of a pixel circuit according to an embodiment of the present application. FIG. 6 is another structure diagram of a pixel circuit according to an embodiment of the present application. Referring to FIGS. 5 and 6, based on the preceding embodiments, the voltage control circuit 10 further includes a first compensation circuit 105, a first terminal of the first compensation circuit 105 is connected to the first terminal N1 of the first driving circuit 101, a second terminal of the first compensation circuit 105 is connected to the control terminal G1 of the first driving circuit 101, and the first compensation circuit 105 is configured to perform compensation on a threshold voltage of the first driving circuit 101 in the voltage write stage. The first terminal of the first voltage write circuit 103 is connected to a first initialization signal line, the second terminal of the first voltage write circuit 103 is connected to the control terminal G1 of the first driving circuit 101, and the first voltage write circuit 103 is configured to write a first initialization voltage Vinit1 transmitted by the first initialization signal line to the control terminal G1 of the first driving circuit 101.

Compared with the pixel circuit in FIG. 4, the pixel circuit shown in FIG. 6 has the first compensation circuit 105 added, and the first compensation circuit 105 is configured to perform threshold compensation on the first driving circuit 101 to improve the reliability of control of the current control circuit 20. The first voltage write circuit 103 is configured to transmit the first initialization voltage Vinit1 on the first initialization signal line.

The first driving circuit 101 includes a first transistor M1, the first voltage write circuit 103 includes a second transistor M2, the first compensation circuit 105 includes a third transistor M3, and the reset circuit 104 includes a twelfth transistor M12. A first electrode of the first transistor M1 is connected to the first power line L1, a second electrode of the first transistor M1 is connected to the control terminal of the current control circuit 20, and a gate of the first transistor M1 is connected to the coupling circuit 102. A gate of the second transistor M2 is connected to a first scanning signal line, a first electrode of the second transistor M2 is connected to the first initialization signal line, and a second electrode of the second transistor M2 is connected to the gate of the first transistor M1. A gate of the third transistor M3 is connected to a second scanning signal line, a first electrode of the third transistor M3 is connected to the second electrode of the first transistor M1, and a second electrode of the third transistor M3 is connected to the gate of the first transistor M1. A gate of the twelfth transistor M12 is connected to a reset signal line, a first electrode of the twelfth transistor M12 is connected to the first power line L1, and a second electrode of the twelfth transistor M12 is connected to the control terminal of the current control circuit 20.

In the voltage write stage, the second transistor M2 is turned on in response to a first scanning signal S1 transmitted by the first scanning signal line to transmit the first initialization voltage Vinit1 to the gate of the first transistor M1 so that a potential of the gate of the first transistor M1 is initialized, thereby preventing a residual voltage of a previous frame from affecting the light emission of a current frame. At this time, the first transistor M1 is in the on state. Then, the third transistor M3 is turned on in response to a second scanning signal S2 transmitted by the second scanning signal line so that the first power voltage VDDW transmitted by the first power line L1 charges the gate of the first transistor M1 through the first transistor M1 and the third transistor M3 until the potential of the gate of the first transistor M1 is VDDW+Vth1, and the first transistor M1 is turned off, where Vth1 denotes the threshold voltage of the first transistor M1. Moreover, the first data voltage Vdata_t is written to the first terminal of the first capacitor C1 (with the coupling circuit 102 including only the first capacitor C1 as an example), and the voltage difference between the first terminal of the first capacitor C1 and the second terminal of the first capacitor C1 is VDDW+Vth1−Vdata_t.

After the first data voltage Vdata_t is written, the reset stage begins. The voltage transmitted by the first power line L1 changes from the first power voltage VDDW to the reset voltage VREF, and the twelfth transistor M12 is turned on in response to a reset signal Set transmitted by the reset signal line to transmit the reset voltage VREF to the control terminal of the current control circuit 20 so that a discharge path between an internal circuit of the current control circuit 20 and the second power line L2 is turned on, and the second power voltage VDDA can be transmitted to the interior of the current control circuit 20 to prepare for the subsequent light emission.

Then, in the voltage normalization stage, the voltage transmitted by the first data line DATA1 jumps from the first data voltage Vdata_t to the sweep signal SWEEP and remains at a high level of the sweep signal SWEEP, where the high level of the sweep signal SWEEP is higher than or equal to a maximum value of the first data voltage Vdata_t. A potential of the first terminal of the first capacitor C1 is pulled up. Under the coupling of the first capacitor C1, the potential of the gate of the first transistor M1 (that is, the potential of point G1) is SWEEP_H+VDDW+Vth1−Vdata_t, where SWEEP_H denotes the high level of the sweep signal SWEEP. That is, the first data voltage Vdata_t is coupled to the gate of the first transistor M1.

In this embodiment, in a normal operating process of the pixel circuit, a low voltage of the first data voltage Vdata_t corresponds to a high grayscale. The lower the first data voltage Vdata_t, the higher the potential of the gate of the first transistor M1. At a constant scanning frequency of the sweep signal SWEEP, the longer the light emission time of the light-emitting circuit 30, the higher the display grayscale. Therefore, the first data voltage Vdata_t is written to the gate of the first transistor M1 by being coupled, and the first data voltage Vdata_t is pulled up in the voltage normalization stage. Since a low level of the first data voltage Vdata_t corresponds to a high grayscale, the first data voltage Vdata_t has a large available voltage range and the number of color scales is large, facilitating the development of grayscales.

Figure 7:
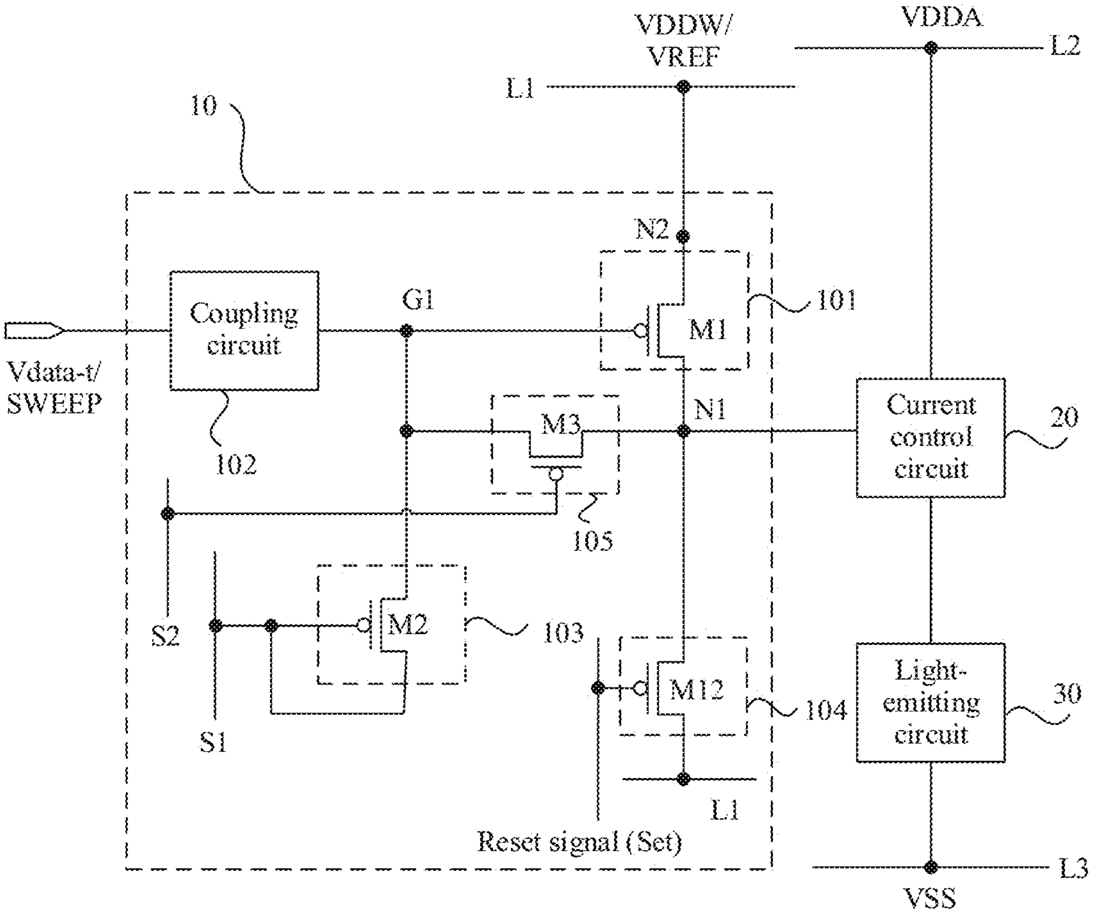
FIG. 7 is another structure diagram of a pixel circuit according to an embodiment of the present application.

FIG. 7 is another structure diagram of a pixel circuit according to an embodiment of the present application. Referring to FIG. 7, based on the preceding technical solutions, optionally, the first scanning signal line also serves as the first initialization signal line. That is, the second transistor M2 is diode-connected: the first electrode of the second transistor M2 is connected to the first scanning signal line, and the first scanning signal line provides the first initialization voltage Vinit1 so that the number of first initialization signal lines can be reduced, facilitating the further reduction of the occupied layout space of the pixel circuit and increasing the PPI. For a operating process of the pixel circuit shown in FIG. 7, refer to the related description of FIG. 6, and the details are not repeated here.

Figure 8:
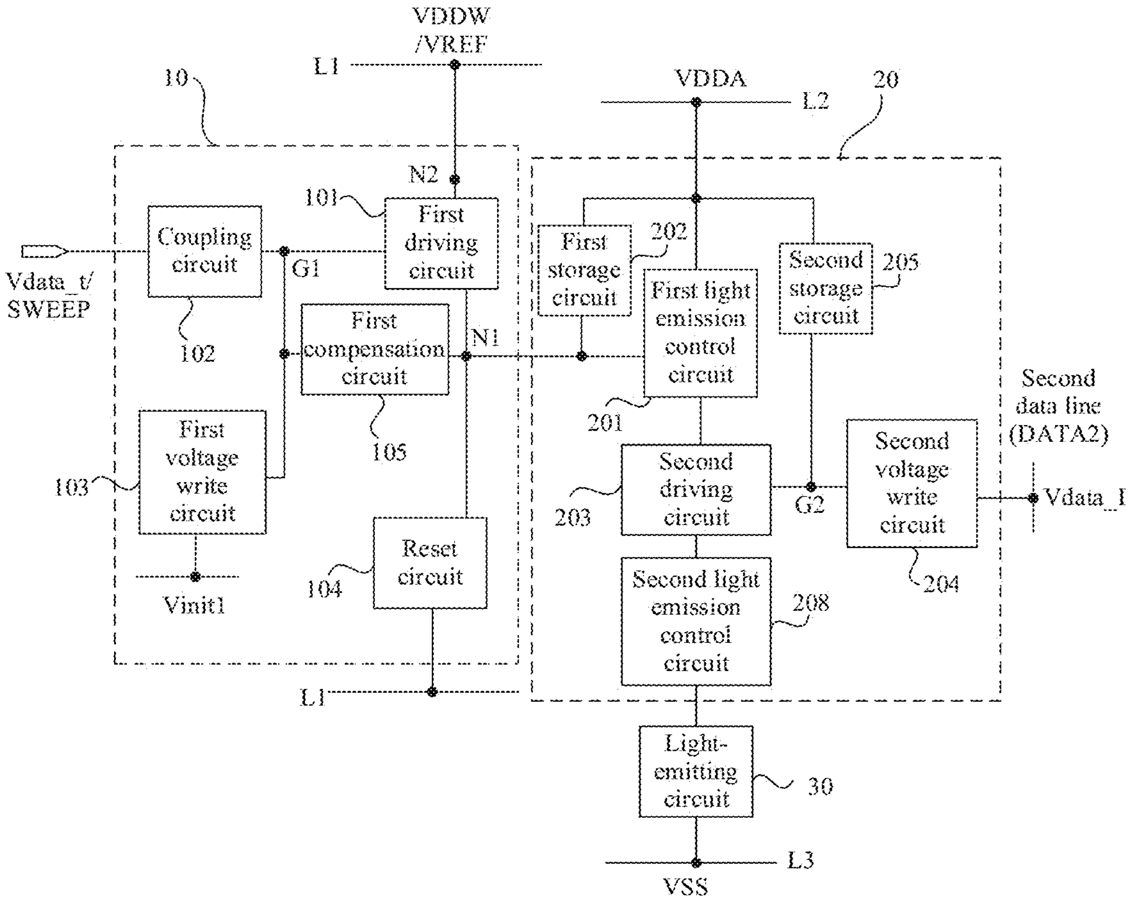
FIG. 8 is another structure diagram of a pixel circuit according to an embodiment of the present application.

FIG. 8 is another structure diagram of a pixel circuit according to an embodiment of the present application. Referring to FIG. 8, based on the preceding technical solutions, optionally, the current control circuit 20 includes a first light emission control circuit 201 and a first storage circuit 202, a control terminal of the first light emission control circuit 201 serves as the control terminal of the current control circuit 20 and is connected to the first terminal N1 of the first driving circuit 101, and the first storage circuit 202 is connected to the control terminal of the first light emission control circuit 201. The current control circuit 20 further includes a second driving circuit 203, a second voltage write circuit 204, a second storage circuit 205 and a second light emission control circuit 208. The second voltage write circuit 204 is connected between a second data line DATA2 and a control terminal G2 of the second driving circuit 203, a first terminal of the first light emission control circuit 201 is connected to the second power voltage VDDA transmitted by the second power line L2, a second terminal of the first light emission control circuit 201 is connected to a first terminal of the second driving circuit 203, and a second terminal of the second driving circuit 203 is connected to the light-emitting circuit 30 through the second light emission control circuit 208.

The second voltage write circuit 204 is configured to write a second data voltage Vdata_I transmitted by the second data line DATA2 to the control terminal G2 of the second driving circuit 203 in the voltage write stage, and the second storage circuit 205 is connected to the control terminal G2 of the second driving circuit 203 to store a voltage of the control terminal G2 of the second driving circuit 203. The second light emission control circuit 208 and the first light emission control circuit 201 are configured to control the on state of the discharge path between the second power line L2 and the light-emitting circuit 30.

Figure 9:
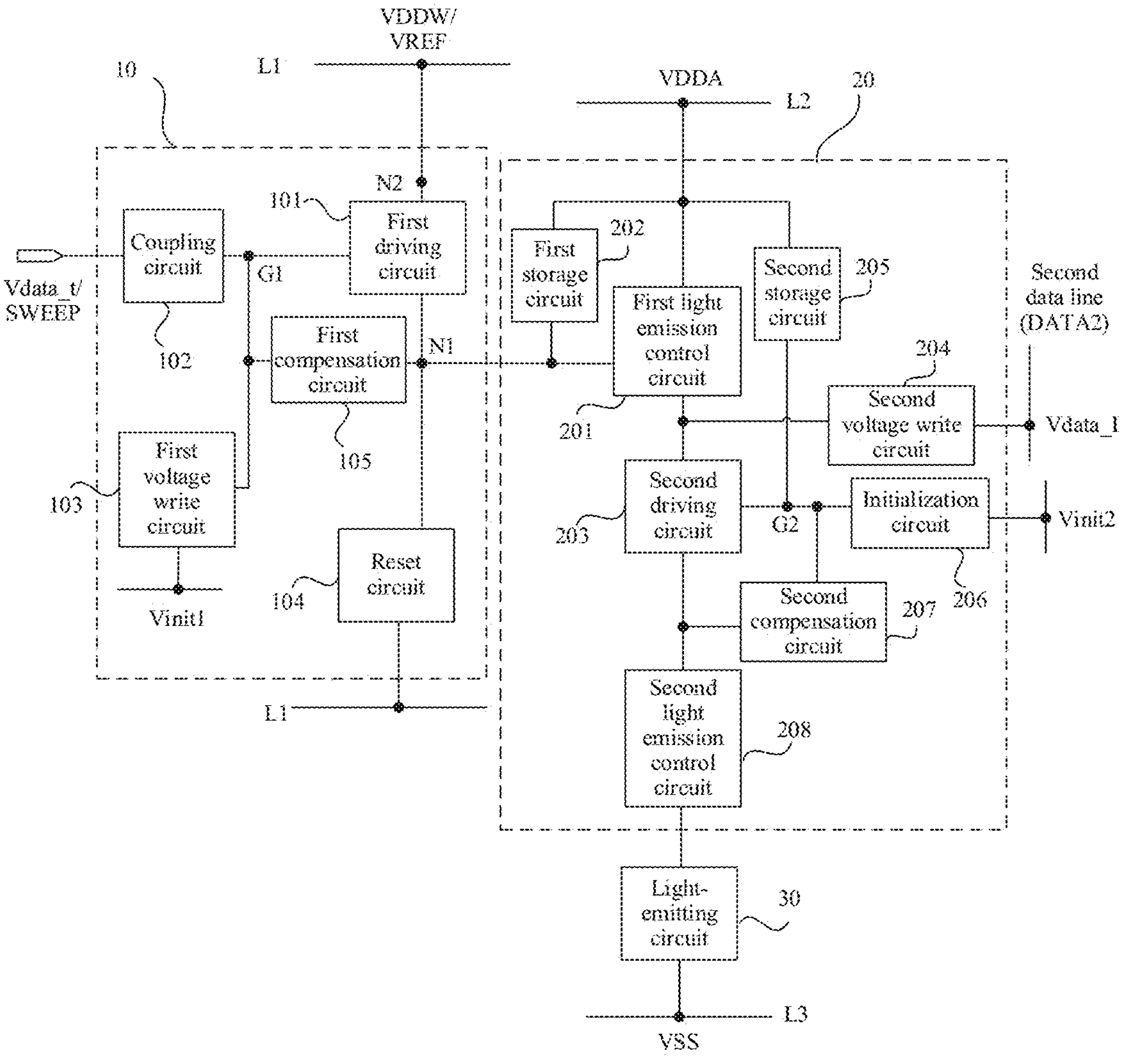
FIG. 9 is another structure diagram of a pixel circuit according to an embodiment of the present application.
Figure 10:
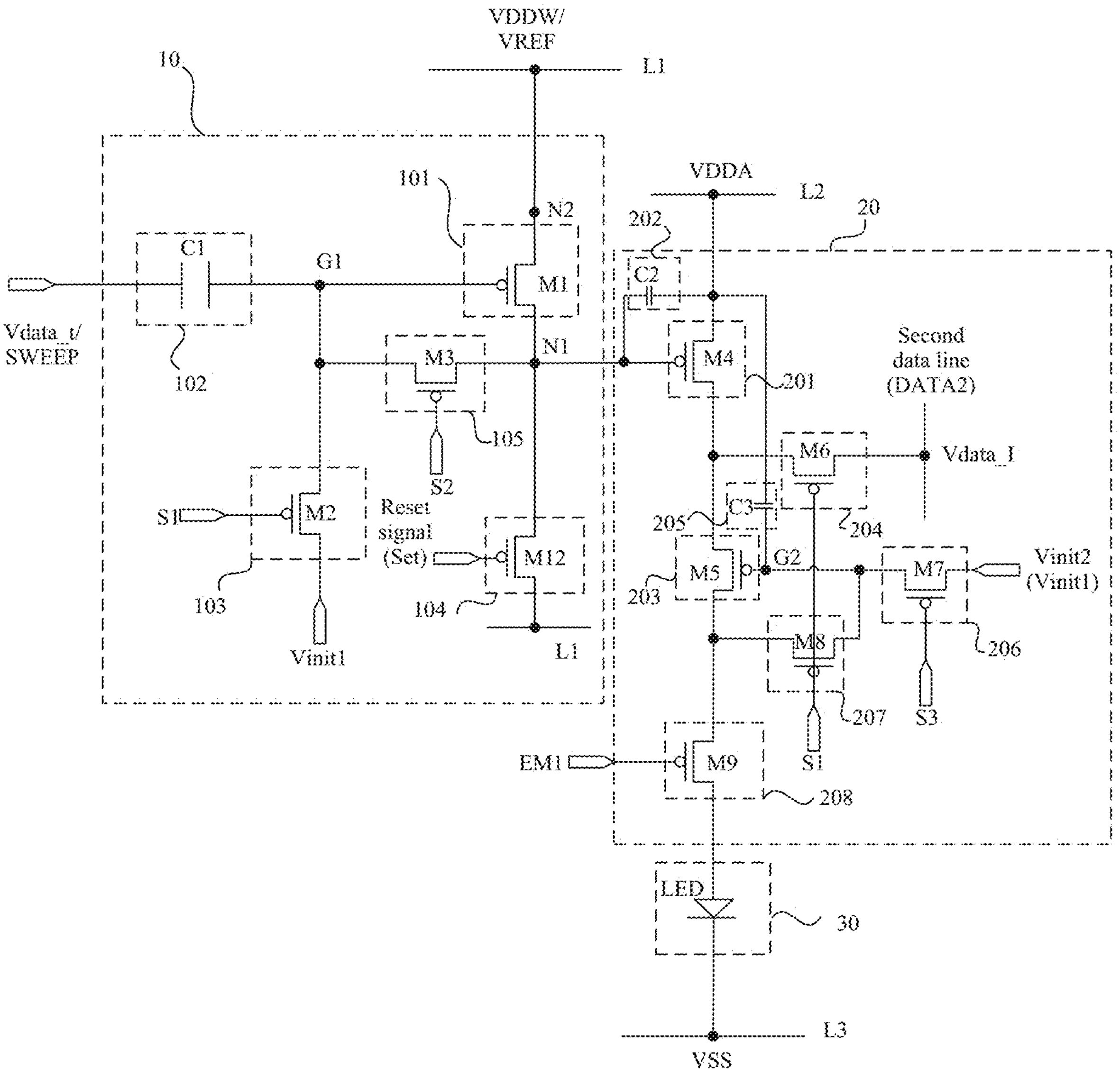
FIG. 10 is another structure diagram of a pixel circuit according to an embodiment of the present application.

FIG. 9 is another structure diagram of a pixel circuit according to an embodiment of the present application. FIG. 10 is another structure diagram of a pixel circuit according to an embodiment of the present application. Referring to FIG. 9, based on the preceding technical solutions, optionally, the current control circuit 20 further includes an initialization circuit 206 and a second compensation circuit 207, the second compensation circuit 207 is connected between the control terminal G2 of the second driving circuit 203 and the second terminal of the second driving circuit 203, and the initialization circuit 206 is configured to write a second initialization voltage Vinit2 transmitted by a second initialization signal line to the control terminal G2 of the second driving circuit 206.

Referring to FIG. 10, the first light emission control circuit 201 includes a fourth transistor M4, the second driving circuit 203 includes a fifth transistor M5, the second voltage write circuit 204 includes a sixth transistor M6, the initialization circuit 206 includes a seventh transistor M7, the second compensation circuit 207 includes an eighth transistor M8, the second light emission control circuit 208 includes a ninth transistor M9, the first storage circuit 202 includes a second capacitor C2, the second storage circuit 205 includes a third capacitor C3, and the light-emitting circuit 30 includes a light-emitting diode (LED).

A gate of the fourth transistor M4 is connected to the first terminal N1 of the first driving circuit 101, a first electrode of the fourth transistor M4 is connected to the second power line L2, and a second electrode of the fourth transistor M4 is connected to a first electrode of the fifth transistor M5. A second electrode of the fifth transistor M5 is connected to a first electrode of the ninth transistor M9, a second electrode of the ninth transistor M9 is connected to a first electrode of the LED, a second electrode of the LED is connected to the third power line L3, and a gate of the ninth transistor M9 is connected to a first light emission control signal line. A gate of the sixth transistor M6 and a gate of the eighth transistor M8 are connected to the first scanning signal line, a first electrode of the sixth transistor M6 is connected to the second data line DATA2, a second electrode of the sixth transistor M6 is connected to the first electrode of the fifth transistor M5, a first electrode of the eighth transistor M8 is connected to a gate of the fifth transistor M5, and a second electrode of the eighth transistor M8 is connected to the second electrode of the fifth transistor M5. A gate of the seventh transistor M7 is connected to a third scanning signal line, a first electrode of the seventh transistor M7 is connected to the second initialization signal line, and a second electrode of the seventh transistor M7 is connected to the gate of the fifth transistor M5.

A first electrode of the second capacitor C2 and a first electrode of the third capacitor C3 are connected to the first electrode of the fourth transistor M4, a second electrode of the second capacitor C2 is connected to the gate of the fourth transistor M4, and a second electrode of the third capacitor C3 is connected to the gate of the fifth transistor M5.

Figure 11:
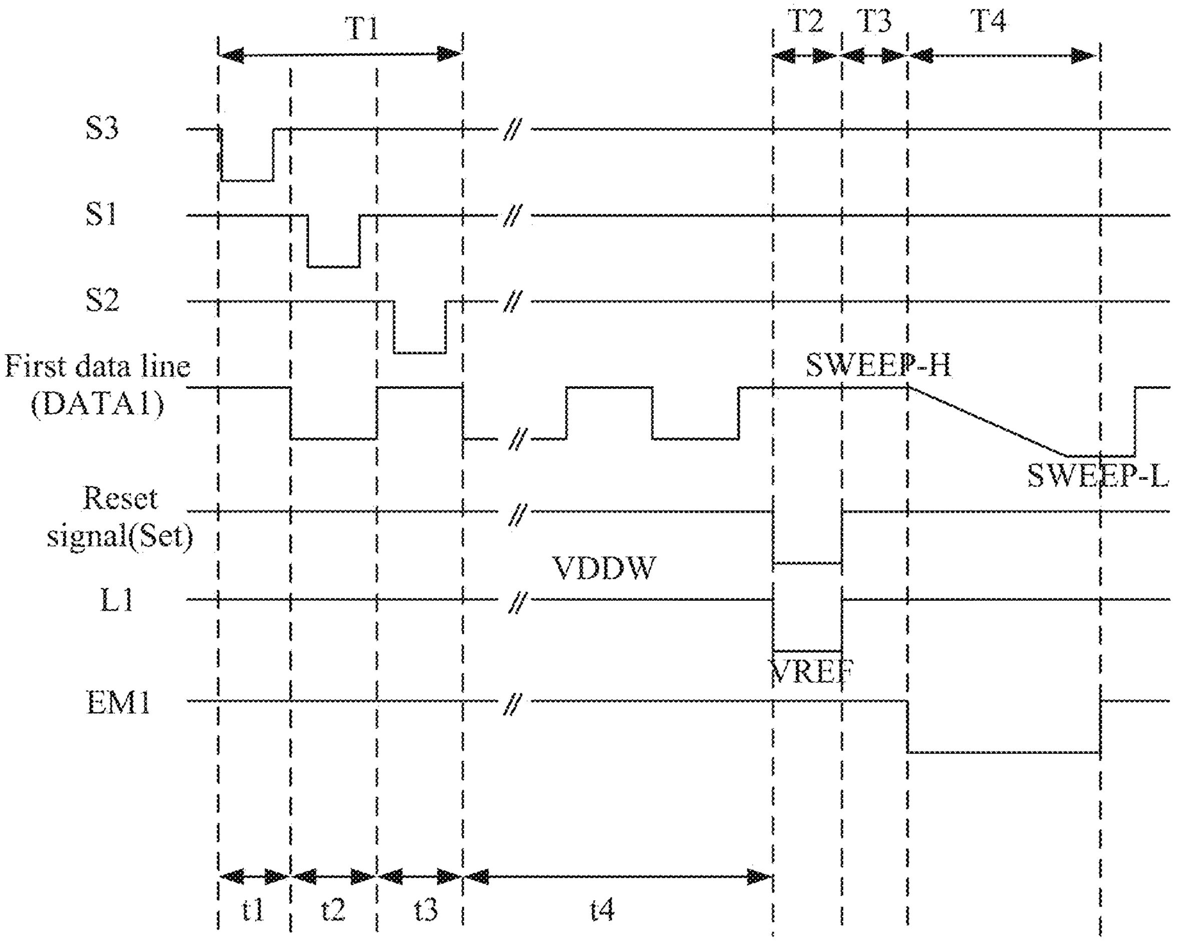
FIG. 11 is a timing graph of a pixel circuit according to an embodiment of the present application.

FIG. 11 is a timing graph of a pixel circuit according to an embodiment of the present application, which is applicable to the pixel circuit shown in FIG. 10. In conjunction with FIGS. 10 and 11, an example in which all the transistors are p-type transistors is used, and the operating process of the pixel circuit according to the embodiment of the present application includes at least a voltage write stage T1, a reset stage T2, a voltage normalization stage T3 and a light emission stage T4, where the voltage write stage T1 includes at least an initialization stage t1, a second voltage write stage t2 and a first voltage write stage t3.

In the initialization stage t1, the reset signal line is configured to transmit the reset signal Set at the logic high level, the third scanning signal line is configured to transmit a third scanning signal S3 at the logic low level, the second scanning signal line is configured to transmit the second scanning signal S2 at the logic high level, the first scanning signal line is configured to transmit the first scanning signal S1 at the logic high level, and the first light emission control signal line is configured to transmit a first light emission control signal EM1 at the logic high level. The seventh transistor M7 is turned on, and the second initialization voltage Vinit2 transmitted by the second initialization signal line is written to the gate of the fifth transistor M5 to initialize a potential of the gate of the fifth transistor M5.

In the second voltage write stage t2, the reset signal line is configured to transmit the reset signal Set at the logic high level, the third scanning signal line is configured to transmit the third scanning signal S3 at the logic high level, the second scanning signal line is configured to transmit the second scanning signal S2 at the logic high level, the first scanning signal line is configured to transmit the first scanning signal S1 at the logic low level, and the first light emission control signal line is configured to transmit the first light emission control signal EM1 at the logic high level. The sixth transistor M6, the eighth transistor M8 and the second transistor M2 are turned on. The second data voltage Vdata_I is written to the gate of the fifth transistor M5 through the sixth transistor M6, the fifth transistor M5 and the eighth transistor M8 so that the potential of the gate of the fifth transistor M5 is Vdata_I+Vth5 and is stored in the third capacitor C3, where Vth5 denotes a threshold voltage of the fifth transistor M5, thereby implementing threshold compensation on the fifth transistor M5. The first initialization voltage Vinit1 transmitted by the first initialization signal line is written to the gate of the first transistor M1 through the second transistor M2 to initialize the potential of the gate of the first transistor M1.

In the first voltage write stage t3, the reset signal line is configured to transmit the reset signal Set at the logic high level, the third scanning signal line is configured to transmit the third scanning signal S3 at the logic high level, the second scanning signal line is configured to transmit the second scanning signal S2 at the logic low level, the first scanning signal line is configured to transmit the first scanning signal S1 at the logic high level, and the first light emission control signal line is configured to transmit the first light emission control signal EM1 at the logic high level. The third transistor M3 is turned on, and the first power voltage VDDW transmitted by the first power line L1 charges the gate of the first transistor M1 until the potential of the gate of the first transistor M1 is VDDW+Vth1, and the first transistor M1 is turned off. The potential of the gate of the first transistor M1 is stabilized at VDDW+Vth1, thereby implementing the threshold compensation on the first transistor M1, where Vth1 denotes the threshold voltage of the first transistor M1. The first data voltage Vdata_t transmitted by the first data line DATA1 is written to the first terminal of the first capacitor C1, and the voltage difference between the first terminal of the first capacitor C1 and the second terminal of the first capacitor C1 is VDDW+Vth1−Vdata_t.

In a stage t4, the remaining multiple rows of sub-pixels undergo the initialization stage t1, the second voltage write stage t2 and the first voltage write stage t3 row by row to complete the data writing of all pixel rows.

In the reset stage T2, the voltage transmitted by the first power line L1 jumps from the first power voltage VDDW to the reset voltage VREF, the reset signal line is configured to transmit the reset signal Set at the logic low level, the third scanning signal line is configured to transmit the third scanning signal S3 at the logic high level, the second scanning signal line is configured to transmit the second scanning signal S2 at the logic high level, the first scanning signal line is configured to transmit the first scanning signal S1 at the logic high level, and the first light emission control signal line is configured to transmit the first light emission control signal EM1 at the logic high level. The twelfth transistor M12 is turned on, and the reset voltage VREF transmitted by the first power line L1 is transmitted to the gate of the fourth transistor M4 to control the fourth transistor M4 to be turned on so that the second power voltage VDDA transmitted by the second power line L2 is transmitted to the first electrode of the fifth transistor M5.

In the voltage normalization stage T3, the first data voltage Vdata_t transmitted by the first data line DATA1 jumps to the high level SWEEP-H of the sweep signal SWEEP. In this embodiment, the high level SWEEP-H of the sweep signal SWEEP is higher than or equal to the maximum value of the first data voltage Vdata_t. A voltage of the first terminal of the first capacitor C1 is pulled up to SWEEP-H, a voltage of the second terminal of the first capacitor C1 becomes VDDW+Vth1−Vdata_t+SWEEP-H, and the first transistor M1 is turned off. The reset voltage VREF transmitted by the first power line L1 jumps to the first power voltage VDDW. In this case, although the first transistor M1 is in the off state, the fourth transistor M4 remains in the on state since the reset voltage VREF has been stored in the second capacitor C2.

In the light emission stage T4, the reset signal line is configured to transmit the reset signal Set at the logic high level, the third scanning signal line is configured to transmit the third scanning signal S3 at the logic high level, the second scanning signal line is configured to transmit the second scanning signal S2 at the logic high level, the first scanning signal line is configured to transmit the first scanning signal S1 at the logic high level, and the first light emission control signal line is configured to transmit the first light emission control signal EM1 at the logic low level. The ninth transistor M9 is turned on, the discharge path between the second power line L2 and the third power line L3 is turned on, and the fifth transistor M5 outputs a driving current according to the second data voltage Vdata_I at the gate of the fifth transistor M5 to drive the light-emitting circuit 30 to emit light. The driving current may be expressed by the following formula:

$$
\begin{aligned}
Id &= \frac{1}{2}\mu C_{ox}\frac{W}{L}(V_{GS} - Vth5)^2 \\
&= \frac{1}{2}\mu C_{ox}\frac{W}{L}(\text{Vdata\_I} + Vth5 - VDDA - Vth5)^2 \\
&= \frac{1}{2}\mu C_{ox}\frac{W}{L}(\text{Vdata\_I} - VDDA)^2.
\end{aligned}
$$

In the above formula, u denotes an electron mobility of the fifth transistor M5, Cox denotes channel capacitance in a unit area of the fifth transistor M5, W/L demotes a width-to-length ratio of the fifth transistor M5, and Vth5 denotes the threshold voltage of the fifth transistor M5. In this embodiment, the light-emitting circuit 30 may include one or more of an organic light-emitting diode (OLED), a micro light-emitting diode (microLED) and a mini light-emitting diode (mini LED).

In the light emission stage T4, the sweep signal SWEEP gradually changes from the high level SWEEP-H to a low level SWEEP-L. Under the coupling of the first capacitor C1, the potential of the gate of the first transistor M1 changes synchronously. When the sweep signal SWEEP decreases so that the potential VG1 of the gate of the first transistor M1 satisfies that VG1−VDDW=Vth1, the first transistor M1 is turned on, and the first power voltage VDDW is transmitted to the gate of the fourth transistor M4 through the first transistor M1 to control the fourth transistor M4 to be turned off. Therefore, the second electrode of the fourth transistor M4 is disconnected from the second power line L2, the driving current is zero, and the light-emitting circuit 30 stops emitting light, thereby controlling the light emission time.

Figure 12:
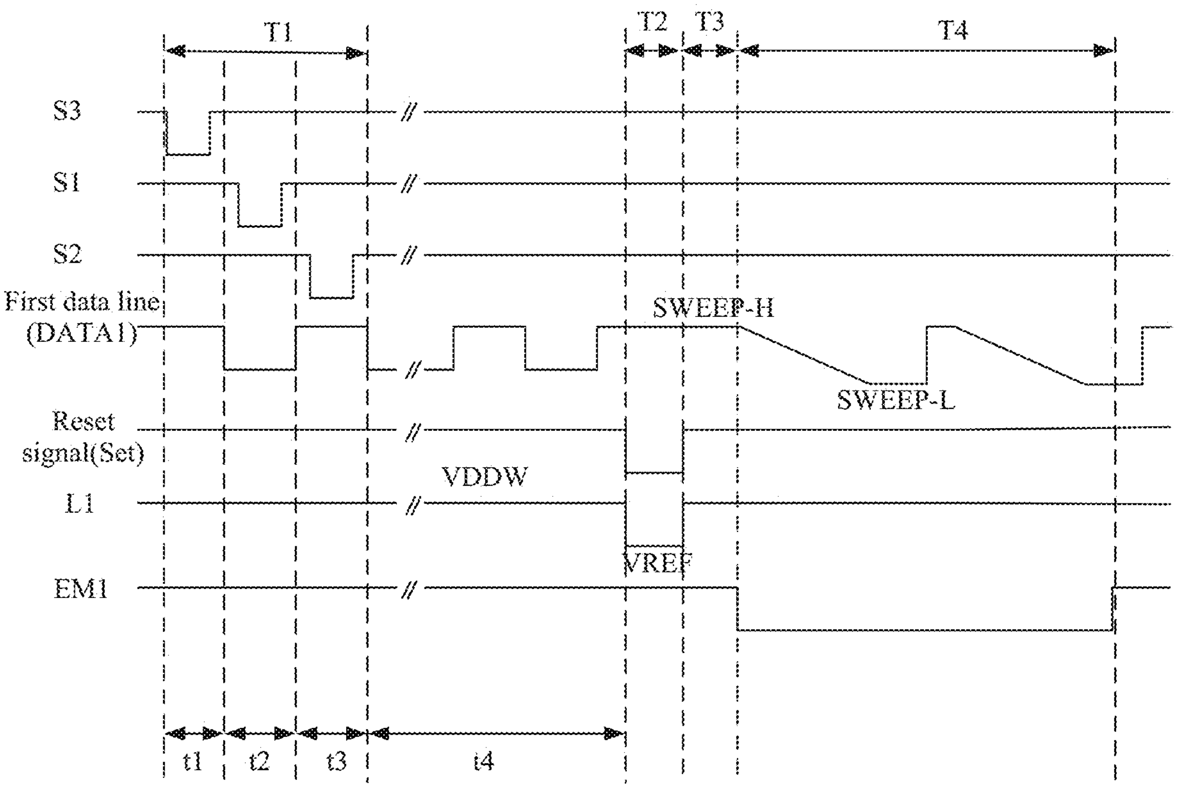
FIG. 12 is another timing graph of a pixel circuit according to an embodiment of the present application.

Optionally, according to the technical solutions in this embodiment, the setting of one time of data writing and multiple times of light emission can be achieved in one frame, which is conducive to solving the problem of flicker at a low grayscale. FIG. 12 is another timing graph of a pixel circuit according to an embodiment of the present application, which is also applicable to the pixel circuit shown in FIG. 10.

In this embodiment, a magnitude of the driving current depends on a magnitude of the second data voltage Vdata_I and is irrelevant to the threshold voltage Vth5 of the fifth transistor M5, facilitating the improvement of uniformity of chromaticity of the light-emitting circuit 30. The light emission time of the light-emitting circuit 30 depends on the first data voltage Vdata_t and the sweep signal SWEEP. When the sweep signal SWEEP is at the high level, the light-emitting circuit 130 is in a bright state. In a scanning process of the sweep signal SWEEP from the high level to the low level, the voltage of the first terminal of the first capacitor C1 gradually decreases. Under the coupling of the capacitor, the voltage of the gate of the first transistor M1 gradually decreases. When the potential VG1 of the gate of the first transistor M1 satisfies that VG1−VDDW=Vth1, the first transistor M1 is turned on, and the first power voltage VDDW is transmitted to the gate of the fourth transistor M4 so that the fourth transistor M4 is turned off, and the light-emitting circuit 30 is in a dark state. As shown in FIG. 12, in the light emission stage of one display frame, the sweep signal SWEEP includes multiple sub-signals, each sub-signal corresponds to one light emission sub-stage, and each sub-signal of the sweep signal SWEEP repeats the above operation process. Thus, a slope of the sweep signal SWEEP and the bright-dark switching speed of the light-emitting circuit 30 can be increased, facilitating the improvement of poor display due to a very slow switching speed of the light-emitting circuit 30 from the bright state to the dark state at a low grayscale. The sweep signal SWEEP may be a ramp signal such as a sawtooth wave or a triangle wave.

Optionally, in this embodiment, the first initialization signal line may also serve as the second initialization signal line, and the first voltage write circuit 103 and the initialization circuit 206 are connected to the first initialization voltage Vinit1 so that the number of second initialization signal lines can be reduced, facilitating the reduction of the occupied layout space of the pixel circuit and increasing the PPI.

Figure 13:
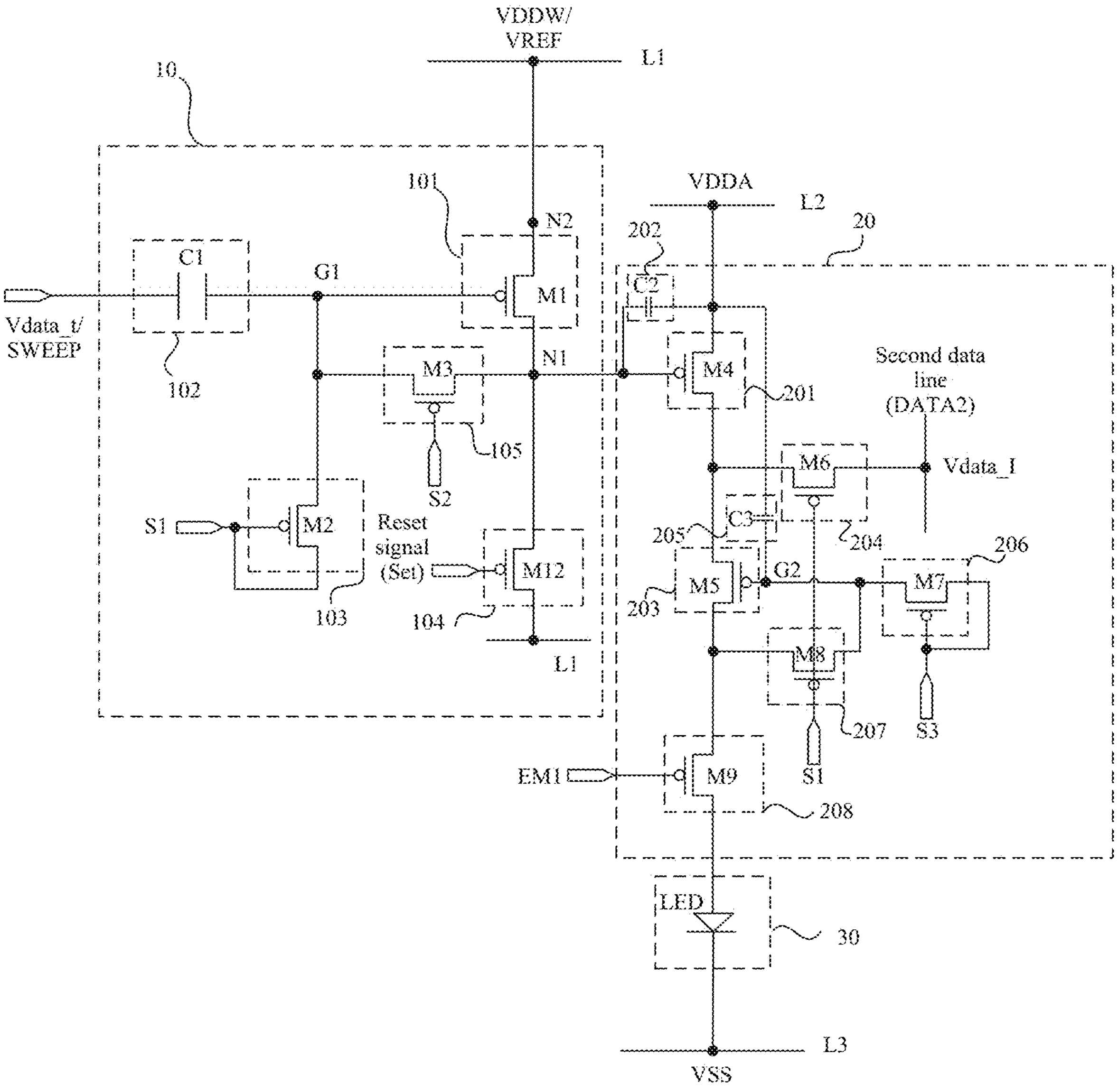
FIG. 13 is another structure diagram of a pixel circuit according to an embodiment of the present application.

FIG. 13 is another structure diagram of a pixel circuit according to an embodiment of the present application. Referring to FIG. 13, based on the preceding technical solutions, optionally, the third scanning signal line also serves as the second initialization signal line, that is, the seventh transistor M7 is diode-connected: the first electrode of the seventh transistor M7 is connected to the third scanning signal line, and the third scanning signal line provides the second initialization voltage Vinit2 so that the number of second initialization signal lines can be reduced, facilitating the further reduction of the occupied layout space of the pixel circuit and increasing the PPI. For a operating process of the pixel circuit shown in FIG. 13, refer to the related description of FIG. 10, and the details are not repeated here.

Figure 14:
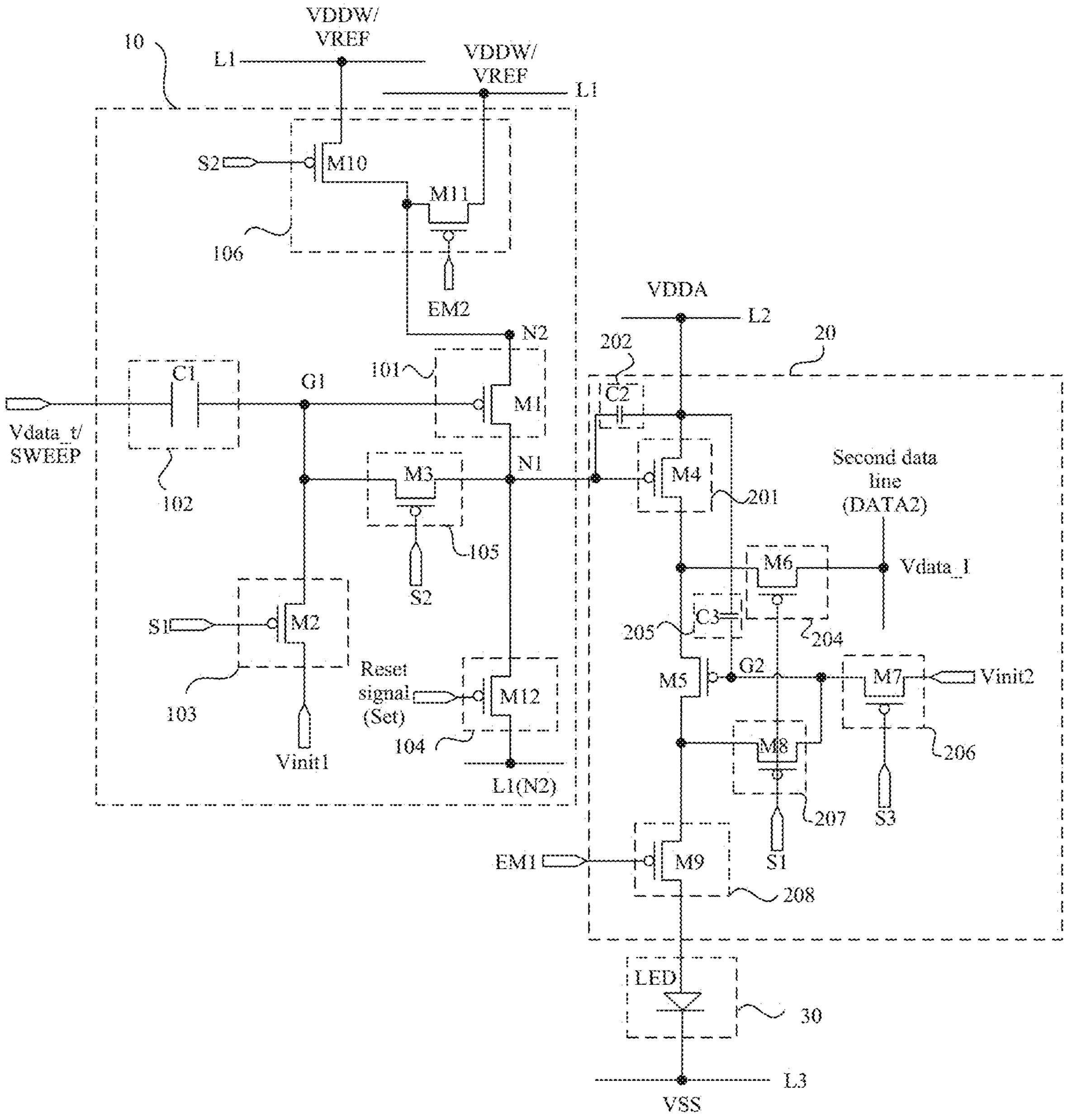
FIG. 14 is another structure diagram of a pixel circuit according to an embodiment of the present application.

FIG. 14 is another structure diagram of a pixel circuit according to an embodiment of the present application. Referring to FIG. 14, based on the preceding technical solutions, optionally, the pixel circuit further includes a third voltage write circuit 106, the third voltage write circuit 106 is connected between the first power line L1 and the second terminal of the first driving circuit 101, and the third voltage write circuit 106 is configured to transmit the voltage transmitted by the first power line L1 to the second terminal of the first driving circuit 101.

Due to an on-state capacitor between the gate of the first transistor M1 and the first electrode of the first transistor M1, when the second electrode of the first transistor M1 is directly connected to the first power line L1, the on-state capacitor is also directly connected to the first power line L1. After the data writing, charges flow through the on-state capacitor and thus affect a charge or discharge rate of the gate of the first transistor M1, which reduces the accuracy of control of the light emission time and is not conducive to the development of grayscales. The third voltage write circuit 106 is disposed so that after the data writing, the on-state capacitor can be put in a floating state, which is equivalent to no capacitor at the gate of the first transistor M1, so that the charge or discharge rate of the first transistor M1 is not affected, and the light emission time of the light-emitting circuit 30 can be better controlled.

For example, the third voltage write circuit 106 includes a tenth transistor M10 and an eleventh transistor M11. A gate of the tenth transistor M10 is connected to the second scanning signal line, a first electrode of the tenth transistor M10 is connected to the first power line L1, a second electrode of the tenth transistor M10 is connected to the second terminal N2 of the first driving circuit 101. A gate of the eleventh transistor M11 is connected to a second light emission control signal line, a first electrode of the eleventh transistor M11 is connected to the first power line L1, and a second electrode of the eleventh transistor M11 is connected to the second terminal N2 of the first driving circuit 101.

Figure 15:
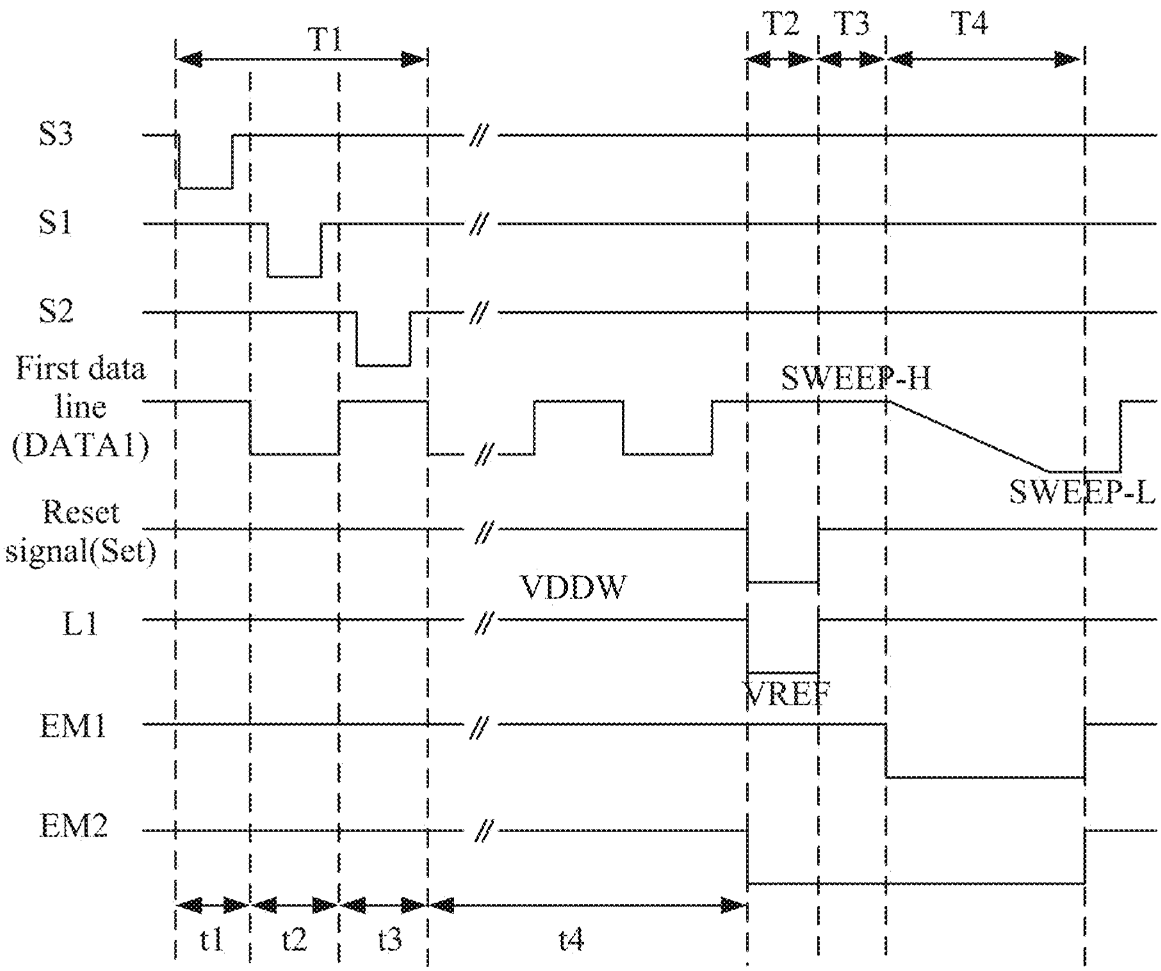
FIG. 15 is another timing graph of a pixel circuit according to an embodiment of the present application.

In this embodiment, the first electrode of the twelfth transistor M12 may be directly connected to the first power line L1 or connected to the second electrode of the eleventh transistor M11. Whether to turn on the eleventh transistor M11 in the reset stage T2 may be selected according to a connection situation of the twelfth transistor M12. FIG. 15 is another timing graph of a pixel circuit according to an embodiment of the present application. Referring to FIG. 15, using an example in which the first electrode of the twelfth transistor M12 is connected to the second electrode of the eleventh transistor M11 (that is, node N2), in the reset stage T2, the voltage transmitted by the first power line L1 jumps from the first power voltage VDDW to the reset voltage VREF, a second light emission control signal EM2 at a low level and transmitted by the second light emission control signal line controls the eleventh transistor M11 to be turned on, and the reset voltage VREF transmitted by the first power line L1 is transmitted to the gate of the fourth transistor M4 through the eleventh transistor M11 and the twelfth transistor M12 to control the fourth transistor M4 to be turned on so that the second power voltage VDDA transmitted by the second power line L2 is transmitted to the first electrode of the fifth transistor M5. In the initialization stage t1, the second voltage write stage t2 and the stage t4, since the tenth transistor M10 and the eleventh transistor M11 are turned off, the on-state capacitor does not exist between the gate of the first transistor M1 and the first electrode of the first transistor M1 (between node G1 and node N2) so that the charge or discharge rate of the first transistor M1 is not affected, and the accuracy of the voltage of the gate of the first transistor M1 can be ensured.

Figure 16:
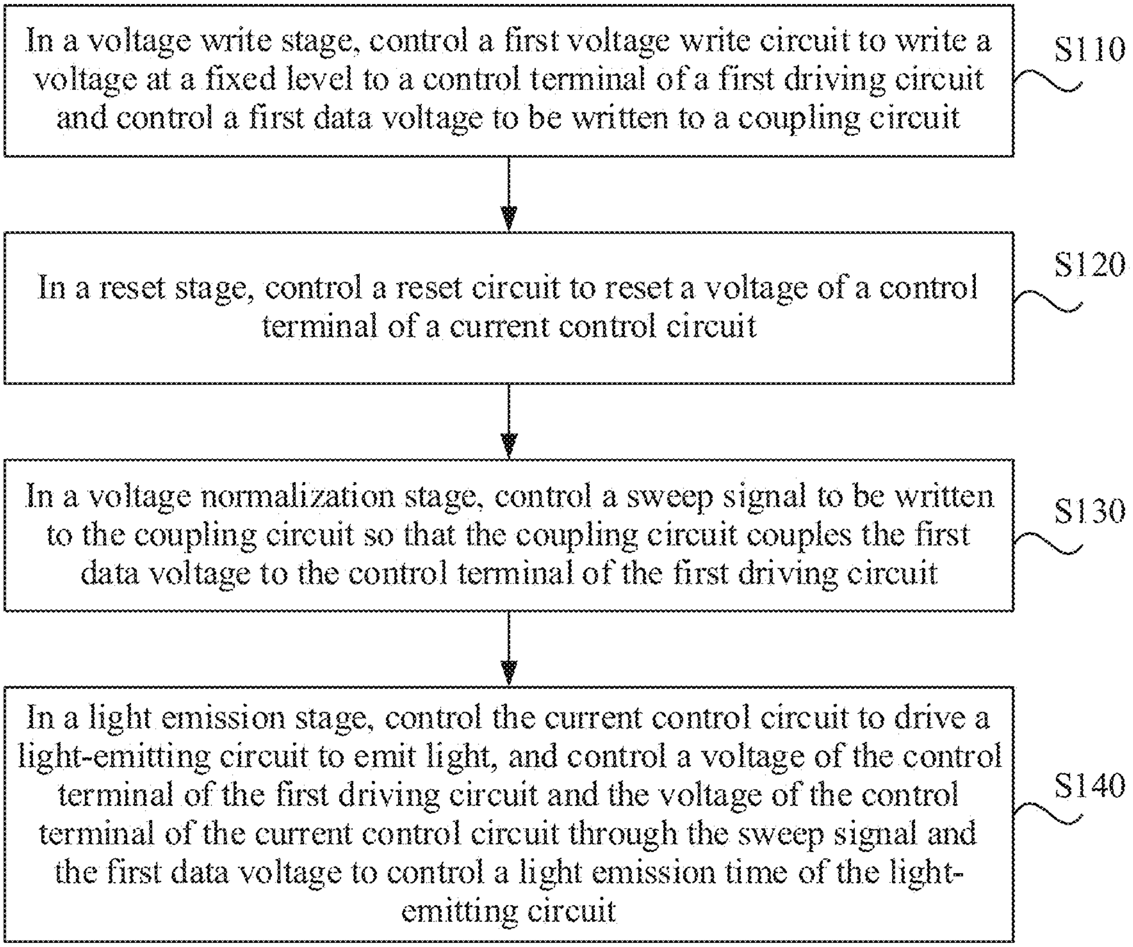
FIG. 16 is a flowchart of a driving method for a pixel circuit according to an embodiment of the present application.

Optionally, the present application further provides a driving method for a pixel circuit, where the pixel circuit according to any embodiment of the present application can be driven by the driving method. In conjunction with FIG. 1, the pixel circuit includes a voltage control circuit 10, a current control circuit 20 and a light-emitting circuit 30. The voltage control circuit 10 includes a first driving circuit 101, a coupling circuit 102, a first voltage write circuit 103 and a reset circuit 104. The coupling circuit 102 and the first voltage write circuit 103 are connected to a control terminal G1 of the first driving circuit 101. The first driving circuit 101 is connected between a first power line L1 and a control terminal of the current control circuit 20. The current control circuit 20 and the light-emitting circuit 30 are connected between a second power line L2 and a third power line L3. FIG. 16 is a flowchart of a driving method for a pixel circuit according to an embodiment of the present application. Referring to FIG. 16, the driving method for the pixel circuit includes S110 to S140.

In S110, in a voltage write stage, the first voltage write circuit is controlled to write a voltage at a fixed level to the control terminal of the first driving circuit and a first data voltage is controlled to be written to the coupling circuit.

In S120, in a reset stage, the reset circuit is controlled to reset a voltage of the control terminal of the current control circuit.

In S130, in a voltage normalization stage, a sweep signal is controlled to be written to the coupling circuit so that the coupling circuit couples the first data voltage to the control terminal of the first driving circuit.

In S140, in a light emission stage, the current control circuit is controlled to drive the light-emitting circuit to emit light, and a voltage of the control terminal of the first driving circuit and the voltage of the control terminal of the current control circuit are controlled through the sweep signal and the first data voltage to control a light emission time of the light-emitting circuit.

In the driving method for the pixel circuit according to the embodiment of the present application, the first data voltage is indirectly written to the control terminal of the first driving circuit through the coupling circuit so that an on state of the first driving circuit does not need to be set according to a magnitude of the first data voltage, and no requirement is imposed on magnitudes of the first data voltage and a power voltage (such as a first power voltage) connected to a second terminal of the first driving circuit. The first power voltage can be flexibly set so that a voltage difference between voltages of a pixel can be reduced, and devices are subjected to a smaller bias voltage, facilitating the improvement of the reliability of the pixel circuit. Moreover, in this embodiment, no voltage write control circuit or unit is needed, and the pixel circuit is simple in structure, which is conducive to saving layout space and increasing the PPI.

Figure 17:
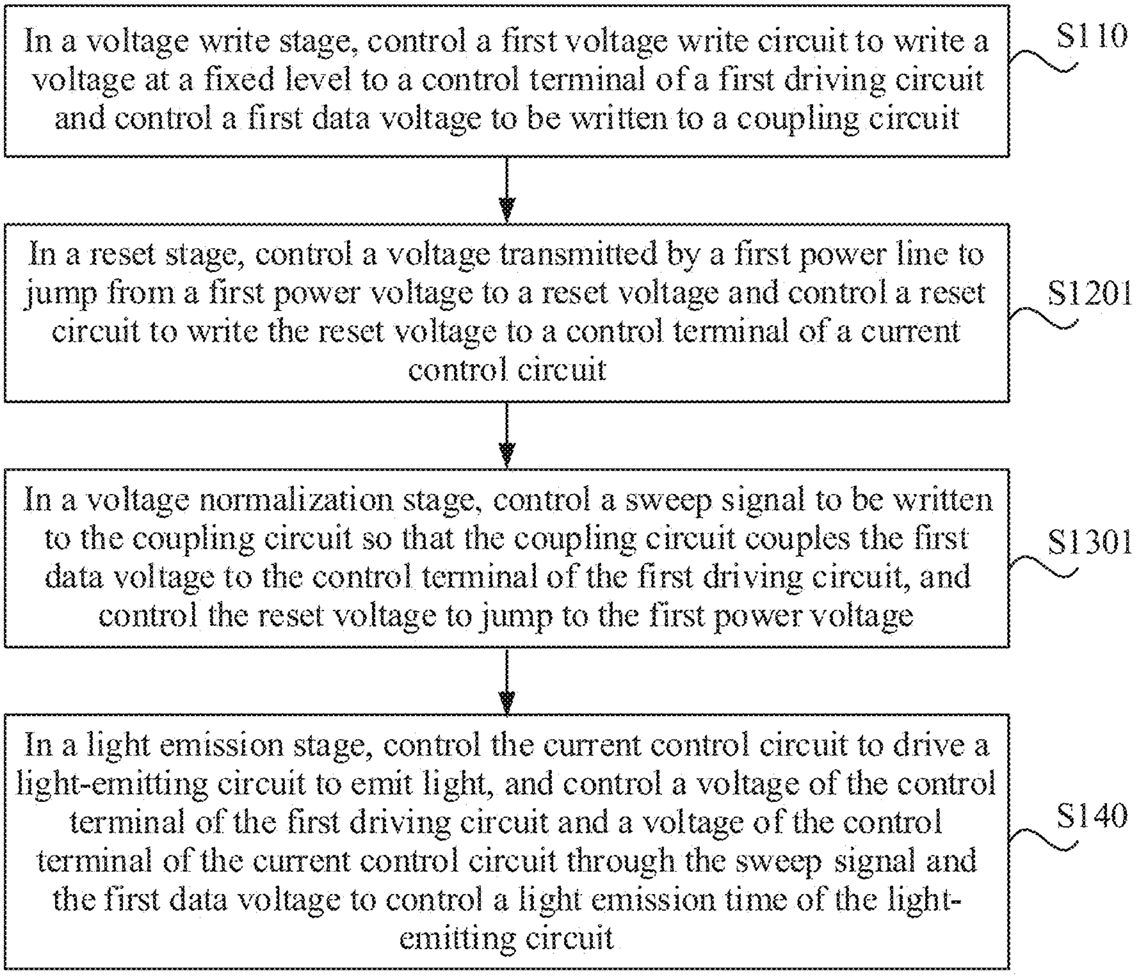
FIG. 17 is another flowchart of a driving method for a pixel circuit according to an embodiment of the present application.

In this embodiment, the reset circuit 104 may be connected between the first power line L1 and the control terminal of the current control circuit 20, and the first power line L1 is configured to transmit a voltage that jumps from the first power voltage VDDW to a reset voltage VREF at least in the reset stage and jumps from the reset voltage VREF to the first power voltage VDDW after the reset stage. FIG. 17 shows another driving method for a pixel circuit according to an embodiment of the present application. Referring to FIG. 17, the driving method for the pixel circuit includes S110 to S140.

In S110, in the voltage write stage, the first voltage write circuit is controlled to write the voltage at the fixed level to the control terminal of the first driving circuit and the first data voltage is controlled to be written to the coupling circuit.

In S1201, in the reset stage, the voltage transmitted by the first power line is controlled to jump from the first power voltage to the reset voltage, and the reset circuit is controlled to write the reset voltage to the control terminal of the current control circuit.

In S1301, in the voltage normalization stage, the sweep signal is controlled to be written to the coupling circuit so that the coupling circuit couples the first data voltage to the control terminal of the first driving circuit, and the reset voltage is controlled to jump to the first power voltage.

In S140, in the light emission stage, the current control circuit is controlled to drive the light-emitting circuit to emit light, and the voltage of the control terminal of the first driving circuit and the voltage of the control terminal of the current control circuit are controlled through the sweep signal and the first data voltage to control the light emission time of the light-emitting circuit.

Still referring to FIG. 10, the first voltage write circuit 103 is connected between a first initialization signal line and the control terminal G1 of the first driving circuit 101, and a control terminal of the first voltage write circuit 103 is connected to a first scanning signal line. The voltage control circuit 10 further includes a first compensation circuit 105, the first compensation circuit 105 is connected between a first terminal N1 of the first driving circuit 101 and the control terminal G1 of the first driving circuit 101, and a control terminal of the first compensation circuit 105 is connected to a second scanning signal line. A control terminal of the reset circuit 104 is connected to a reset signal line. The current control circuit 20 includes a first light emission control circuit 201, a first storage circuit 202, a second driving circuit 203, a second voltage write circuit 204, a second storage circuit 205, an initialization circuit 206, a second compensation circuit 207 and a second light emission control circuit 208. A control terminal of the first light emission control circuit 201 serves as the control terminal of the current control circuit 20 and is connected to the first terminal N1 of the first driving circuit 101. The first storage circuit 202 is connected to the control terminal of the first light emission control circuit 201. The first light emission control circuit 201 is connected between the second power line L2 and a first terminal of the second driving circuit 203. A control terminal of the second voltage write circuit 204 and a control terminal of the second compensation circuit 207 are connected to the first scanning signal line, the second voltage write circuit 204 is connected between a second data line DATA2 and the first terminal of the second driving circuit 203, and the second compensation circuit 207 is connected between a control terminal G2 of the second driving circuit 203 and a second terminal of the second driving circuit 203. The initialization circuit 206 is connected between a second initialization signal line and the control terminal G2 of the second driving circuit 203, and a control terminal of the initialization circuit 206 is connected to a third scanning signal line. A control terminal of the second light emission control circuit 208 is connected to a first light emission control signal line, and the second light emission control circuit 208 is connected between the second terminal of the second driving circuit 203 and the light-emitting circuit 30.

In conjunction with FIG. 11, in this embodiment, a voltage write stage T1 includes an initialization stage t1, a second voltage write stage t2 and a first voltage write stage t3.

In the initialization stage t1, a third scanning signal S3 at the low level and transmitted by the third scanning signal line controls the initialization circuit 206 to be turned on, and a second initialization voltage Vinit2 transmitted by the second initialization signal line is written to the control terminal G2 of the second driving circuit 203 to initialize a potential of the control terminal of the second driving circuit 203.

In the second voltage write stage t2, a first scanning signal S1 at the low level and transmitted by the first scanning signal line controls the second voltage write circuit 204, the second compensation circuit 207 and the first voltage write circuit 103 to be turned on. A second data voltage Vdata_I is written to the control terminal G2 of the second driving circuit 203 through the second voltage write circuit 204, the second driving circuit 203 and the second compensation circuit 207 so that the potential of the control terminal G2 of the second driving circuit 203 is Vdata_I+Vth5 and stored in the second storage circuit 205, where Vth5 denotes a threshold voltage of a fifth transistor M5, thereby implementing threshold compensation on the fifth transistor M5. Moreover, a first initialization voltage Vinit1 transmitted by the first initialization signal line is written to the control terminal G1 of the first driving circuit 101 through the first voltage write circuit 103 to initialize a potential of the control terminal G1 of the first driving circuit 101.

In the first voltage write stage t3, a second scanning signal S2 at the low level and transmitted by the second scanning signal line controls the first compensation circuit 105 to be turned on, and the first power voltage VDDW transmitted by the first power line L1 charges the control terminal G1 of the first driving circuit 101, thereby implementing the threshold compensation on the first driving circuit 101. Moreover, the first data voltage Vdata_t transmitted by a first data line DATA1 is written to a first terminal of the coupling circuit 102.

In a stage t4, the remaining multiple rows of sub-pixels undergo the initialization stage t1, the second voltage write stage t2 and the first voltage write stage t3 row by row to complete the data writing of all pixel rows.

For specific operations in the reset stage T2, the voltage normalization stage T3 and the light emission stage T4, refer to the related description in the preceding multiple embodiments. The driving method also has the effects described in the preceding multiple embodiments. The details are not repeated here.

Figure 18:
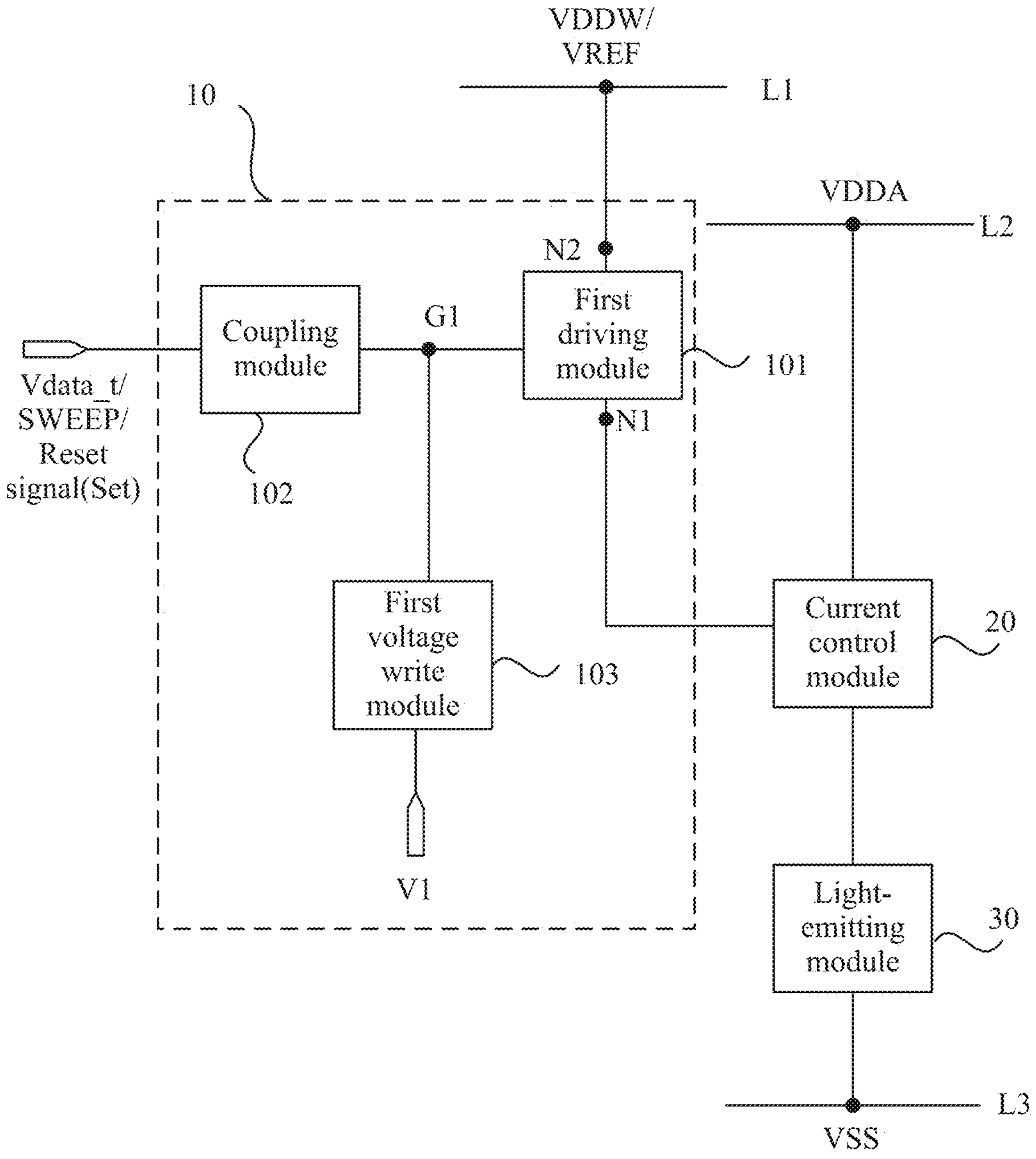
FIG. 18 is another structure diagram of a pixel circuit according to an embodiment of the present application.

FIG. 18 is another structure diagram of a pixel circuit according to an embodiment of the present application. Referring to FIG. 18, the pixel circuit provided in this embodiment includes a voltage control circuit 10, a current control circuit 20 and a light-emitting circuit 30. The voltage control circuit 10 includes a first driving circuit 101, a first voltage write circuit 103 and a coupling circuit 102. The first voltage write circuit 103 is configured to transmit a voltage V1 at a fixed level to a control terminal G1 of the first driving circuit 101. The first driving circuit 101 is connected between a first power line L1 and a control terminal of the current control circuit 20, where a voltage transmitted by the first power line L1 is a jump voltage. The coupling circuit 102 is configured to couple a first data voltage Vdata_t and a sweep signal SWEEP to the control terminal G1 of the first driving circuit 101 and couple a reset signal Set to the control terminal G1 of the first driving circuit 101. The current control circuit 20 and the light-emitting circuit 30 are connected between a second power line L2 and a third power line L3. The current control circuit 20 is configured to drive the light-emitting circuit 30 to emit light. The first driving circuit 101 is configured to control a voltage of the control terminal of the current control circuit 20 according to the first data voltage Vdata_t and the sweep signal SWEEP to control a light emission time of the light-emitting circuit 30.

For example, the current control circuit 20 and the light-emitting circuit 30 are connected between the second power line L2 and the third power line L3, the second power line L2 is configured to transmit a second power voltage VDDA, and the third power line L3 is configured to transmit a third power voltage VSS. When a discharge path between the second power line L2 and the third power line L3 is turned on, the current control circuit 20 can generate a driving current to drive the light-emitting circuit 30 to emit light. A first terminal N1 of the first driving circuit 101 is connected to the control terminal of the current control circuit 20 and a second terminal N2 of the first driving circuit 101 is connected to the voltage transmitted by the first power line L1. The first driving circuit 101 controls a voltage of the first terminal N1 of the first driving circuit 101 according to the first data voltage Vdata_t and the sweep signal SWEEP written to the control terminal G1 of the first driving circuit 101 to control the voltage of the control terminal of the current control circuit 20. The current control circuit 20 controls an on state of the discharge path between the second power line L2 and the third power line L3 according to the voltage of the control terminal of the current control circuit 20 to control the light emission time of the light-emitting circuit 30.

In this embodiment, the voltage transmitted by the first power line L1 is different from the voltage transmitted by the second power line L2, where the second power voltage VDDA transmitted by the second power line L2 is at a fixed level, and the voltage transmitted by the first power line L1 is the jump voltage, so as to reduce the number of signal lines.

For example, an operating process of the pixel circuit provided in this embodiment includes at least a voltage write stage, a reset stage, a voltage normalization stage and a light emission stage. The first power line L1 may be configured to transmit a voltage that jumps from a first power voltage VDDW to a reset voltage VREF at least in the reset stage and jumps from the reset voltage VREF to the first power voltage VDDW after the reset stage. In the voltage write stage, the first voltage write circuit 103 is configured to transmit the voltage V1 at the fixed level to the control terminal G1 of the first driving circuit 101 to control a potential of the control terminal of the first driving circuit 101 (that is, a potential of a second terminal of the coupling circuit 102). Then, the first data voltage Vdata_t is transmitted to a first terminal of the coupling circuit 102, a potential difference exists between the first terminal of the coupling circuit 102 and the second terminal of the coupling circuit 102, and the voltage transmitted by the first power line L1 is the first power voltage VDDW. In the reset stage, the first power voltage VDDW transmitted by the first power line L1 jumps to the reset voltage VREF, the coupling circuit 102 couples the reset signal Set to the control terminal G1 of the first driving circuit 101 to control the first driving circuit 101 to be turned on, and the first driving circuit 101 transmits the reset voltage VREF to the control terminal of the current control circuit 20 so that the current control circuit 20 is conducted with the second power line L2. In the embodiment of the present application, a circuit for resetting the control terminal of the current control circuit 20 does not need to be disposed separately, facilitating the simplification of the circuit structure and reducing the number of signal lines. In the voltage normalization stage, the coupling circuit 102 couples the sweep signal SWEEP to the control terminal G1 of the first driving circuit 101 to ensure that the first driving circuit 101 is in an off state, and the reset voltage VREF transmitted by the first power line L1 jumps to the first power voltage VDDW. In the light emission stage, the current control circuit 20 is controlled to generate the driving current to drive the light-emitting circuit 30 to emit light. The sweep signal SWEEP is configured to perform signal scanning from a high level to a low level or perform signal scanning from a low level to a high level in the light emission stage to control an output voltage of the first driving circuit 101. Thus, the voltage of the control terminal of the current control circuit 20 is controlled, and a working state (on or off) of the current control circuit 20 is controlled so that the light emission time of the light-emitting circuit 30 is controlled. An initial voltage of the sweep signal SWEEP in the light emission stage is the same as the voltage of the sweep signal SWEEP written to the coupling circuit 102 in the voltage normalization stage.

The first voltage write circuit 103 is connected to the first driving circuit 101. The first voltage write circuit 103 is configured to transmit the fixed voltage V1 to the control terminal G1 of the first driving circuit 101, where the fixed voltage V1 may be at a high level or a low level and may be set according to the specific circuit structure of the first driving circuit 101 and actual requirements.

According to the technical solutions provided in this embodiment, the current control circuit generates the driving current to drive the light-emitting circuit to emit light, and the first driving circuit controls the voltage of the control terminal of the current control circuit to control the period in which the current control circuit is turned on to control the light emission time of the light-emitting circuit. In this embodiment, the power voltages connected to the voltage control circuit and the current control circuit are distinguished, and the power voltage transmitted by the first power line connected to the voltage control circuit is configured to be the jump voltage. In the reset stage, the first power line is configured to transmit the reset voltage, and the coupling circuit couples the reset signal to the control terminal of the first driving circuit to control the first driving circuit to be turned on so that the reset voltage is transmitted to the control terminal of the current control circuit, thereby resetting a control potential of the current control circuit. Compared with a solution where a separate reset circuit is configured to reset the control terminal of the current control circuit, the technical solutions provided in this embodiment have no need to dispose the reset circuit and a reset voltage signal line so that the structure of the pixel circuit can be simplified and the number of signal lines can be reduced, facilitating the increase of the PPI.

Figure 19:
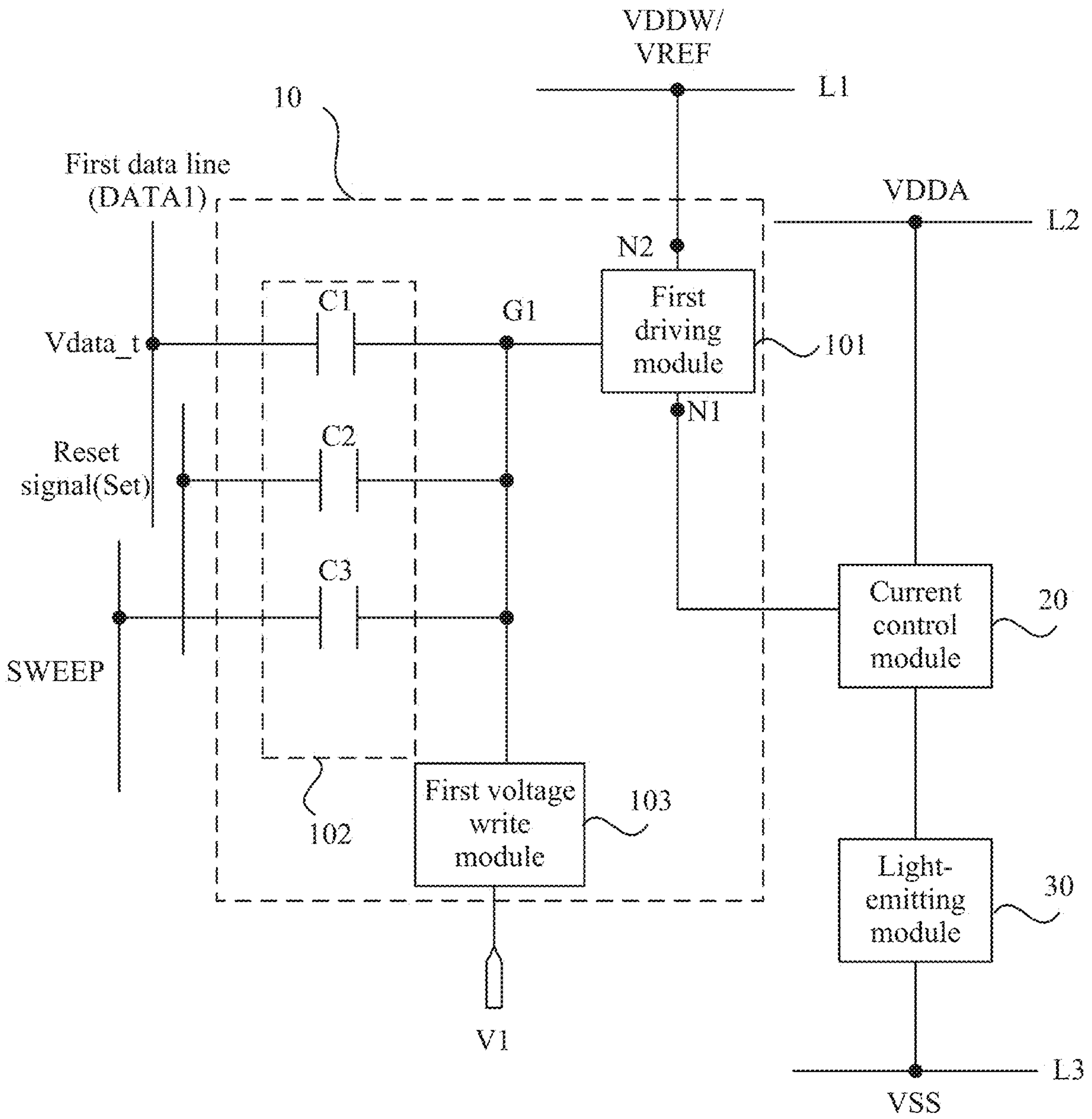
FIG. 19 is another structure diagram of a pixel circuit according to an embodiment of the present application.

FIG. 19 is another structure diagram of a pixel circuit according to an embodiment of the present application. Referring to FIG. 19, based on the preceding technical solutions, the coupling circuit 102 includes a first capacitor C1, a second capacitor C2 and a third capacitor C3. A first terminal of the first capacitor C1 is connected to a first data line DATA1 and a second terminal of the first capacitor C1 is connected to the control terminal G1 of the first driving circuit 101. The first data line DATA1 is configured to transmit the first data voltage Vdata_t to the first terminal of the first capacitor C1 in the voltage write stage, and the first data voltage Vdata_t is coupled to the control terminal G1 of the first driving circuit 101. A first terminal of the second capacitor C2 is connected to a reset signal line, a second terminal of the second capacitor C2 is connected to the control terminal G1 of the first driving circuit 101, and the reset signal line is configured to transmit the reset signal Set to the first terminal of the second capacitor C2 in the reset stage. A first terminal of the third capacitor C3 is connected to a sweep signal line, a second terminal of the third capacitor C3 is connected to the control terminal G1 of the first driving circuit 101, and the sweep signal line is configured to transmit the sweep signal SWEEP to the first terminal of the third capacitor C3 in the voltage normalization stage.

Figure 20:
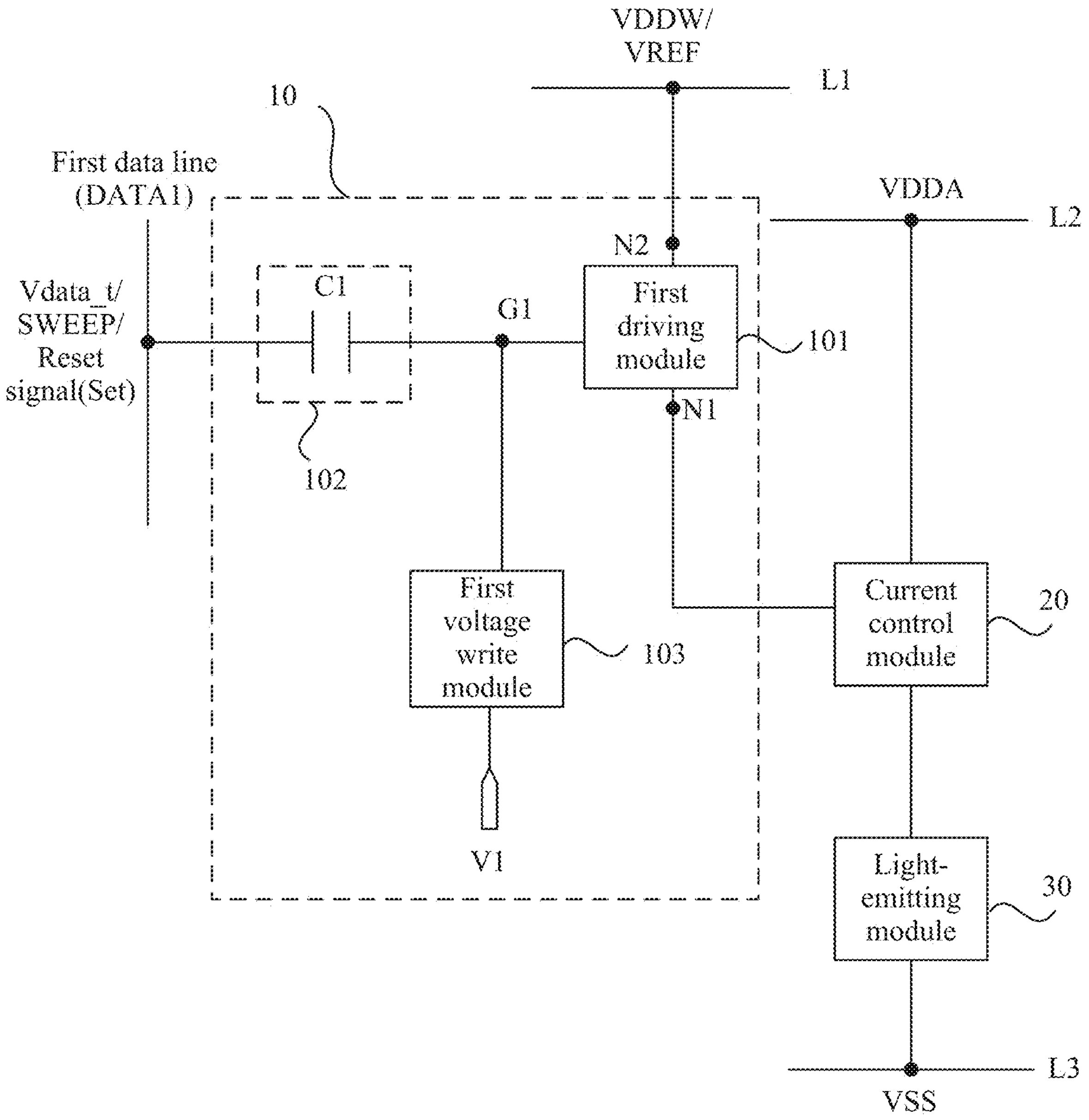
FIG. 20 is another structure diagram of a pixel circuit according to an embodiment of the present application.

Optionally, the coupling circuit 102 may include only one capacitor, and the first data voltage Vdata_t, the reset signal Set and the sweep signal SWEEP share one signal line to further reduce the number of signal lines, facilitating the high PPI of a panel. FIG. 20 is another structure diagram of a pixel circuit according to an embodiment of the present application. Referring to FIG. 20, the coupling circuit 102 includes the first capacitor C1, the first terminal of the first capacitor C1 is connected to the first data line DATA1, and the second terminal of the first capacitor C1 is connected to the control terminal G1 of the first driving circuit 101. The first data line DATA1 is configured to transmit the first data voltage Vdata_t to the first terminal of the first capacitor C1 in the voltage write stage, transmit the reset signal Set to the first terminal of the first capacitor C1 in the reset stage, and transmit the sweep signal SWEEP to the first terminal of the first capacitor C1 in the voltage normalization stage.

For example, in the voltage write stage, the first voltage write circuit 103 is turned on, the fixed voltage V1 is written to the control terminal G1 of the first driving circuit 101, and the first data voltage Vdata_t transmitted by the first data line DATA1 is written to the first terminal of the first capacitor C1. In this case, a voltage difference between the first terminal of the first capacitor C1 and the second terminal of the first capacitor C1 remains a difference between the fixed voltage V1 and the first data voltage Vdata_t.

In the reset stage, the voltage transmitted by the first power line L1 jumps from the first power voltage VDDW to the reset voltage VREF, and the voltage on the first data line DATA1 jumps from the first data voltage Vdata_t to the reset signal Set, where the reset signal Set may be a low-level voltage. A voltage of the first terminal of the first capacitor C1 is pulled down. Under the coupling of the first capacitor C1, a potential of a gate of the first driving circuit 101 becomes a difference between the fixed voltage V1 and a voltage variation of the first terminal of the first capacitor C1, that is, the first data voltage Vdata_t is coupled to the control terminal G1 of the first driving circuit 101. Since the potential of the control terminal of the first driving circuit 101 is pulled down, the first driving circuit 101 is turned on, and the reset voltage VREF transmitted by the first power line L1 is transmitted to the control terminal of the current control circuit 20 to reset a potential of the control terminal of the current control circuit 20.

In the voltage normalization stage, the voltage transmitted by the first power line L1 jumps from the reset voltage VREF to the first power voltage VDDW, the reset signal Set transmitted by the first data line DATA1 jumps to the sweep signal SWEEP, and a potential of the first terminal of the first capacitor C1 is pulled up. Under the coupling of the first capacitor C1, the potential of the control terminal G1 of the first driving circuit 101 is pulled up so that the first driving circuit 101 is turned off. In this case, a voltage of the control terminal G1 of the first driving circuit 101 is associated with the first data voltage Vdata_t.

In the light emission stage, the discharge path between the second power line L2, the current control circuit 20, the light-emitting circuit 30 and the third power line L3 is turned on, and the current control circuit 20 generates the driving current to drive the light-emitting circuit 30 to emit light.

The sweep signal SWEEP gradually changes from the high level to the low level so that the potential of the first terminal of the first capacitor C1 decreases. Under the coupling of the first capacitor C1, the potential of the control terminal G1 of the first driving circuit 101 also decreases. When the potential of the control terminal G1 decreases to one that makes the first driving circuit 101 turned on, the first power voltage VDDW is transmitted to the control terminal of the current control circuit 20 through the first driving circuit 101, and the current control circuit 20 is turned off according to the voltage of the control terminal of the current control circuit 20 so that the current control circuit 20 does not output the driving current, and the light-emitting circuit 30 stops emitting light, thereby controlling the light emission time of the light-emitting circuit 30.

In this embodiment, the first driving circuit 101 and the first voltage write circuit 103 may include transistors to implement voltage writing. For example, the first driving circuit 101 may include a first transistor, and the first voltage write circuit 103 may include a second transistor.

In the preceding multiple embodiments, since the first data voltage Vdata_t is coupled and written to the control terminal G1 of the first driving circuit 101 through the coupling circuit 102, in the operating process of the pixel circuit, the on state of the first driving circuit 101 is no longer affected by the voltage transmitted by the first power line L1. That is, no requirement is imposed on magnitudes of the first data voltage Vdata_t and the voltage transmitted by the first power line L1. In this manner, the voltage transmitted by the first power line L1 can be maintained at a relatively low level so that a voltage difference in the pixel circuit can be reduced, facilitating the reduction of a bias voltage of multiple circuits or devices and reducing a possibility of device failure. The reset signal Set is also coupled to the control terminal G1 of the first driving circuit 101 through the coupling circuit 102. Therefore, when the voltage on the first power line L1 jumps from the first power voltage VDDW to the reset voltage VREF, the voltage of the control terminal G1 of the first driving circuit 101 can still keep the first driving circuit 101 in the on state so that the reset voltage VREF can be flexibly set, facilitating signal simplification.

In this embodiment, no matter whether the first data voltage Vdata_t, the reset signal Set and the sweep signal SWEEP share the same data line or use respective data lines, a switch element for switching is not needed, facilitating the simplification of the circuit structure and the reduction of a system cost.

In the following embodiments, an example in which the first data voltage Vdata_t, the reset signal Set and the sweep signal SWEEP share the first data line DATA1 is used.

In this embodiment, the reset stage is positioned after the voltage write stage and before the voltage normalization stage so that the number of jumps between signal levels on the first data line DATA1 can be reduced, facilitating the simplification of the control timing of the pixel circuit. A minimum voltage of the reset voltage VREF is lower than a minimum voltage of the first data voltage Vdata_t, and a maximum voltage of the sweep signal SWEEP is higher than or equal to a maximum voltage of the first data voltage Vdata_t.

Based on the preceding embodiments, the voltage control circuit 10 further includes a first compensation circuit 105. The current control circuit 20 includes a first light emission control circuit 201, a first storage circuit 202, a second driving circuit 203, a second voltage write circuit 204, a second storage circuit 205 and a second light emission control circuit 208.

Based on the preceding embodiments, the current control circuit 20 further includes an initialization circuit 206 and a second compensation circuit 207.

Figure 21:
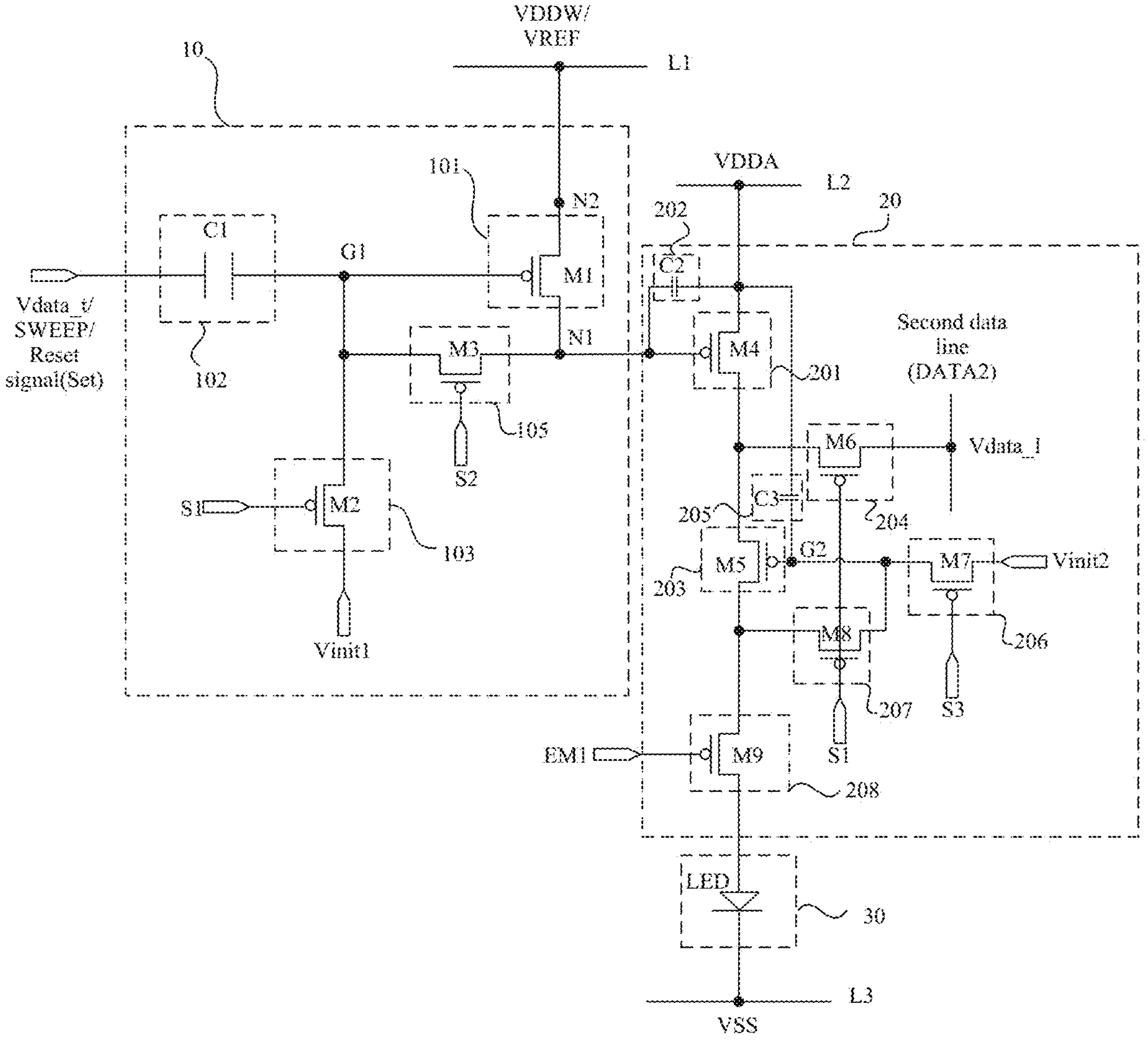
FIG. 21 is another structure diagram of a pixel circuit according to an embodiment of the present application.

FIG. 21 is another structure diagram of a pixel circuit according to an embodiment of the present application. Referring to FIG. 21, based on the preceding technical solutions, the first driving circuit 101 includes a first transistor M1, the first voltage write circuit 103 includes a second transistor M2, the first compensation circuit 105 includes a third transistor M3, the first light emission control circuit 201 includes a fourth transistor M4, the second driving circuit 203 includes a fifth transistor M5, the second voltage write circuit 204 includes a sixth transistor M6, the initialization circuit 206 includes a seventh transistor M7, the second compensation circuit 207 includes an eighth transistor M8, the second light emission control circuit 208 includes a ninth transistor M9, the first storage circuit 202 includes a second capacitor C2, the second storage circuit 205 includes a third capacitor C3, and the light-emitting circuit 30 includes an LED.

For example, a first electrode of the first transistor M1 is connected to the first power line L1, a second electrode of the first transistor M1 is connected to a gate of the fourth transistor M4, and a gate of the first transistor M1 is connected to the coupling circuit 102. A gate of the second transistor M2 is connected to a first scanning signal line, a first electrode of the second transistor M2 is connected to a first initialization signal line, and a second electrode of the second transistor M2 is connected to the gate of the first transistor M1. A gate of the third transistor M3 is connected to a second scanning signal line, a first electrode of the third transistor M3 is connected to the second electrode of the first transistor M1, and a second electrode of the third transistor M3 is connected to the gate of the first transistor M1. A first electrode of the fourth transistor M4 is connected to the second power line L2 and a second electrode of the fourth transistor M4 is connected to a first electrode of the fifth transistor M5. A second electrode of the fifth transistor M5 is connected to a first electrode of the ninth transistor M9, a second electrode of the ninth transistor M9 is connected to a first electrode of the LED, a second electrode of the LED is connected to the third power line L3, and a gate of the ninth transistor M9 is connected to a first light emission control signal line. A gate of the sixth transistor M6 and a gate of the eighth transistor M8 are connected to the first scanning signal line, a first electrode of the sixth transistor M6 is connected to a second data line DATA2, a second electrode of the sixth transistor M6 is connected to the first electrode of the fifth transistor M5, a first electrode of the eighth transistor M8 is connected to a gate of the fifth transistor M5, and a second electrode of the eighth transistor M8 is connected to the second electrode of the fifth transistor M5. A gate of the seventh transistor M7 is connected to a third scanning signal line, a first electrode of the seventh transistor M7 is connected to a second initialization signal line, and a second electrode of the seventh transistor M7 is connected to the gate of the fifth transistor M5. A first electrode of the second capacitor C2 and a first electrode of the third capacitor C3 are connected to the first electrode of the fourth transistor M4, a second electrode of the second capacitor C2 is connected to the gate of the fourth transistor M4, and a second electrode of the third capacitor C3 is connected to the gate of the fifth transistor M5.

Figure 22:
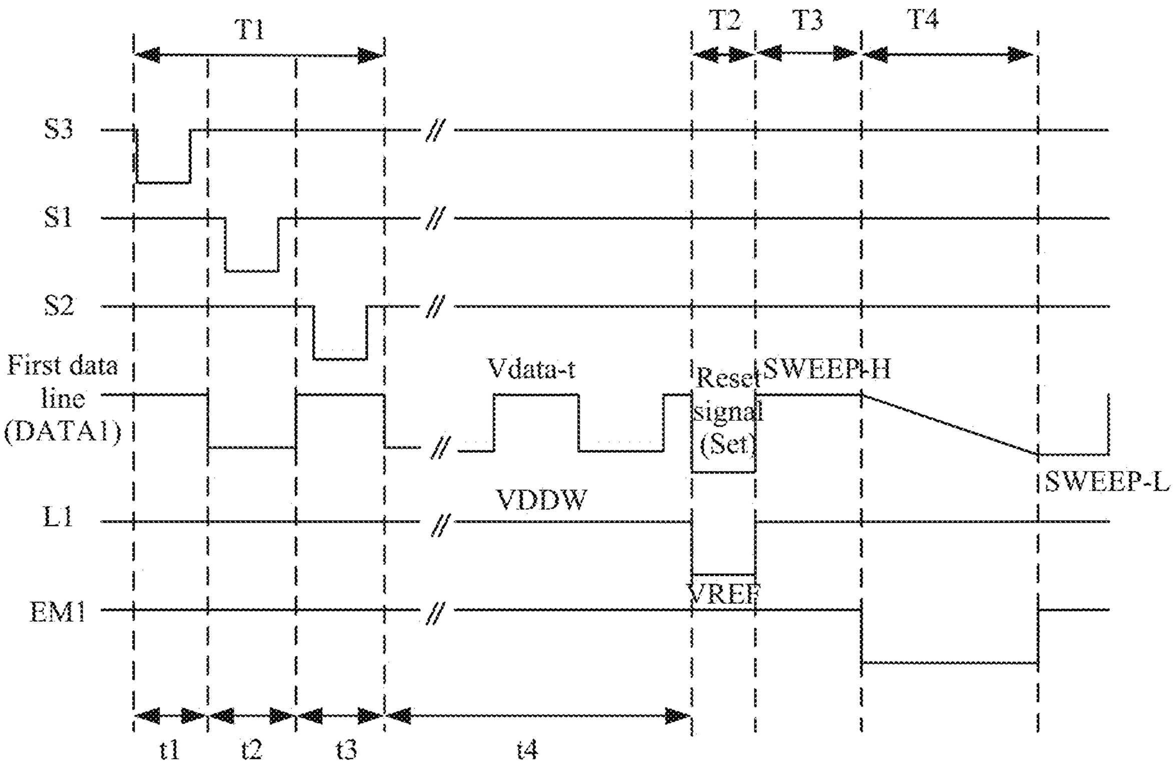
FIG. 22 is another timing graph of a pixel circuit according to an embodiment of the present application.

FIG. 22 is another timing graph of a pixel circuit according to an embodiment of the present application, which is applicable to the pixel circuit shown in FIG. 21. In conjunction with FIGS. 21 and 22, an example in which all the transistors are p-type transistors is used, and the operating process of the pixel circuit according to the embodiment of the present application includes at least a voltage write stage T1, a reset stage T2, a voltage normalization stage T3 and a light emission stage T4, where the voltage write stage T1 includes at least an initialization stage t1, a second voltage write stage t2 and a first voltage write stage t3.

The timing control of the pixel circuit in the initialization stage t1, the second voltage write stage t2, the first voltage write stage t3, a stage t4, the voltage normalization stage T3 and the light emission stage T4 shown in FIG. 22 is the same as the timing control of the pixel circuit in the initialization stage t1, the second voltage write stage t2, the first voltage write stage t3, the stage t4, the voltage normalization stage T3 and the light emission stage T4 shown in FIG. 11, and the details are not repeated here. Only differences from FIG. 11 are described.

In this embodiment, in the reset stage T2, the voltage on the first data line DATA1 changes from the first data voltage Vdata_t to the reset signal Set, and the voltage of the first terminal of the first capacitor C1 is pulled down. Under the coupling of the first capacitor C1, a potential of the gate of the first transistor M1 is VDDW+Vth1−Vdata_t+Vset, the first transistor M1 is turned on, and the reset voltage VREF transmitted by the first power line L1 is transmitted to the gate of the fourth transistor M4 to control the fourth transistor M4 to be turned on so that the second power voltage VDDA transmitted by the second power line L2 is transmitted to the first electrode of the fifth transistor M5. Moreover, the first data voltage Vdata_t and the reset signal Set are coupled and written to the gate of the first transistor M1 through the first capacitor C1. Therefore, according to the technical solutions provided in this embodiment, the circuit for resetting the control terminal of the current control circuit 20 does not need to be disposed separately, facilitating the simplification of the circuit structure and reducing the number of signal lines.

Figure 23:
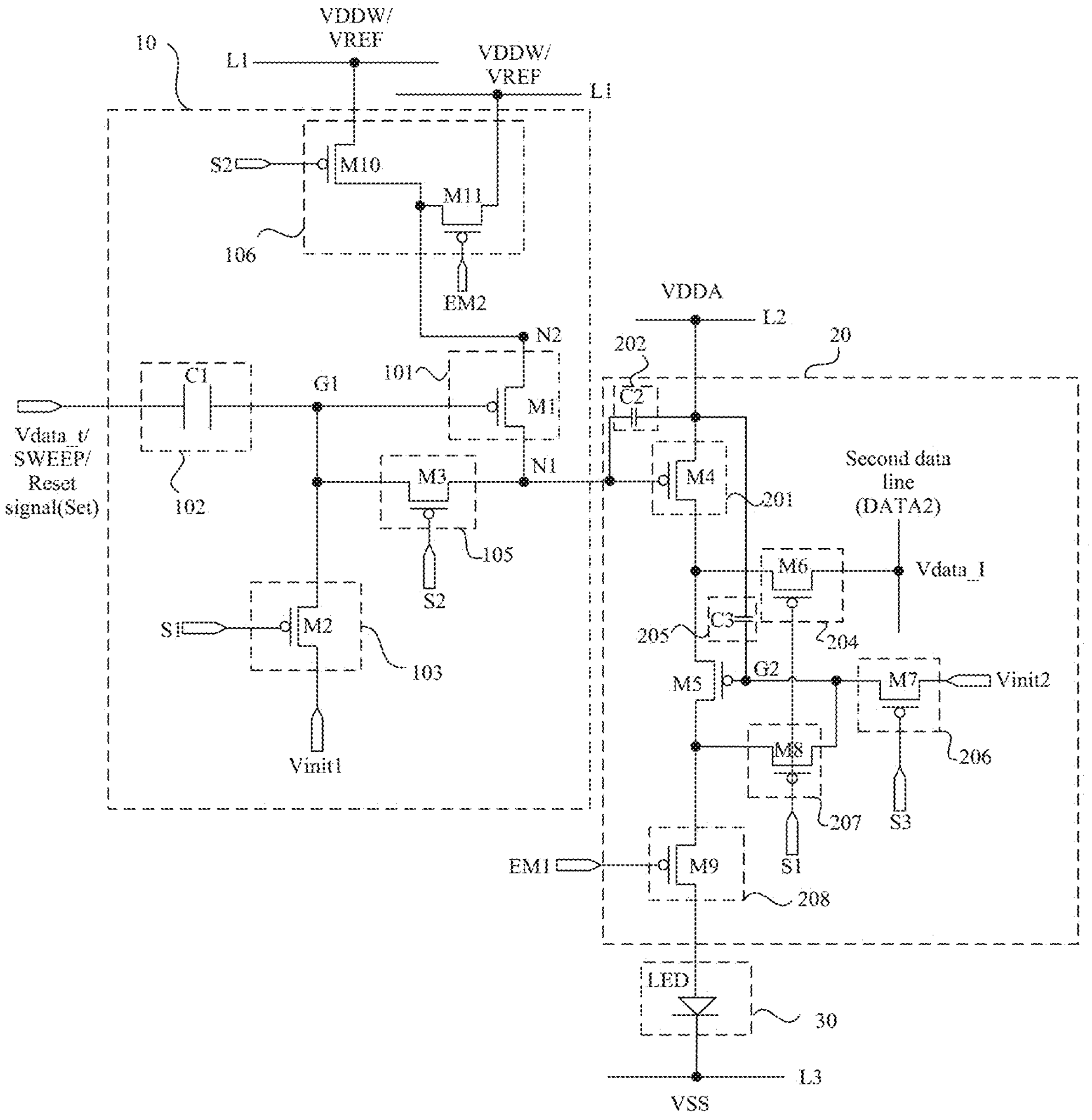
FIG. 23 is another structure diagram of a pixel circuit according to an embodiment of the present application.

FIG. 23 is another structure diagram of a pixel circuit according to an embodiment of the present application. Referring to FIG. 23, based on the preceding multiple technical solutions, optionally, the pixel circuit further includes a third voltage write circuit 106, the third voltage write circuit 106 is connected between the first power line L1 and the second terminal of the first driving circuit 101, and the third voltage write circuit 106 is configured to transmit the voltage transmitted by the first power line to the second terminal of the first driving circuit 101.

The working principle of the third voltage write circuit 106 in the pixel circuit shown in FIG. 23 is the same as the working principle of the third voltage write circuit 106 in the pixel circuit in the embodiment of FIG. 14, and the details are not repeated here.

Figure 24:
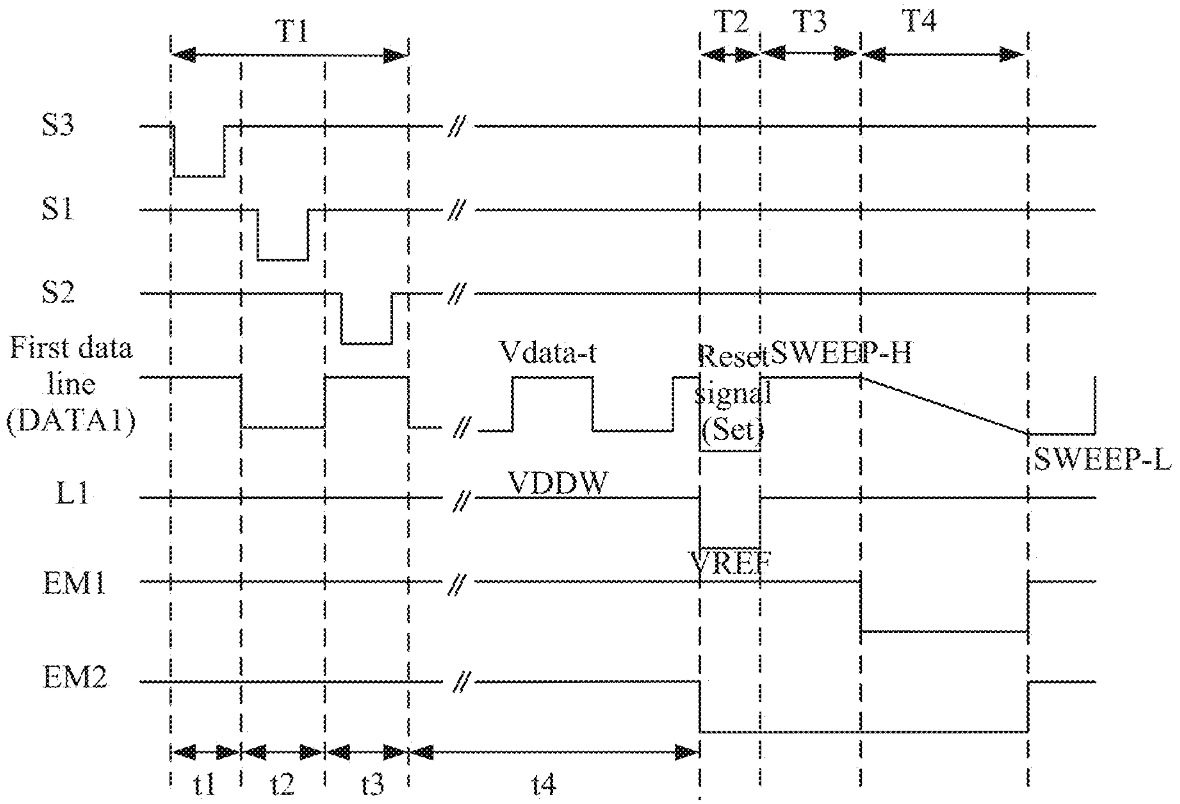
FIG. 24 is another timing graph of a pixel circuit according to an embodiment of the present application.

FIG. 24 is another timing graph of a pixel circuit according to an embodiment of the present application, which is applicable to the pixel circuit shown in FIG. 23. The timing control of the pixel circuit in the initialization stage t1, the second voltage write stage t2, the first voltage write stage t3, the stage t4, the voltage normalization stage T3 and the light emission stage T4 shown in FIG. 24 is the same as the timing control of the pixel circuit in the initialization stage t1, the second voltage write stage t2, the first voltage write stage t3, the stage t4, the voltage normalization stage T3 and the light emission stage T4 shown in FIG. 15, and the details are not repeated here. Only differences from FIG. 15 are described. Referring to FIGS. 23 and 24, in the reset stage T2, the voltage transmitted by the first power line L1 jumps from the first power voltage VDDW to the reset voltage VREF, the voltage on the first data line DATA1 jumps from the first data voltage Vdata_t to the reset signal Set, and the voltage of the first terminal of the first capacitor C1 is pulled down. Under the coupling of the first capacitor C1, the first transistor M1 is turned on.

Figure 25:
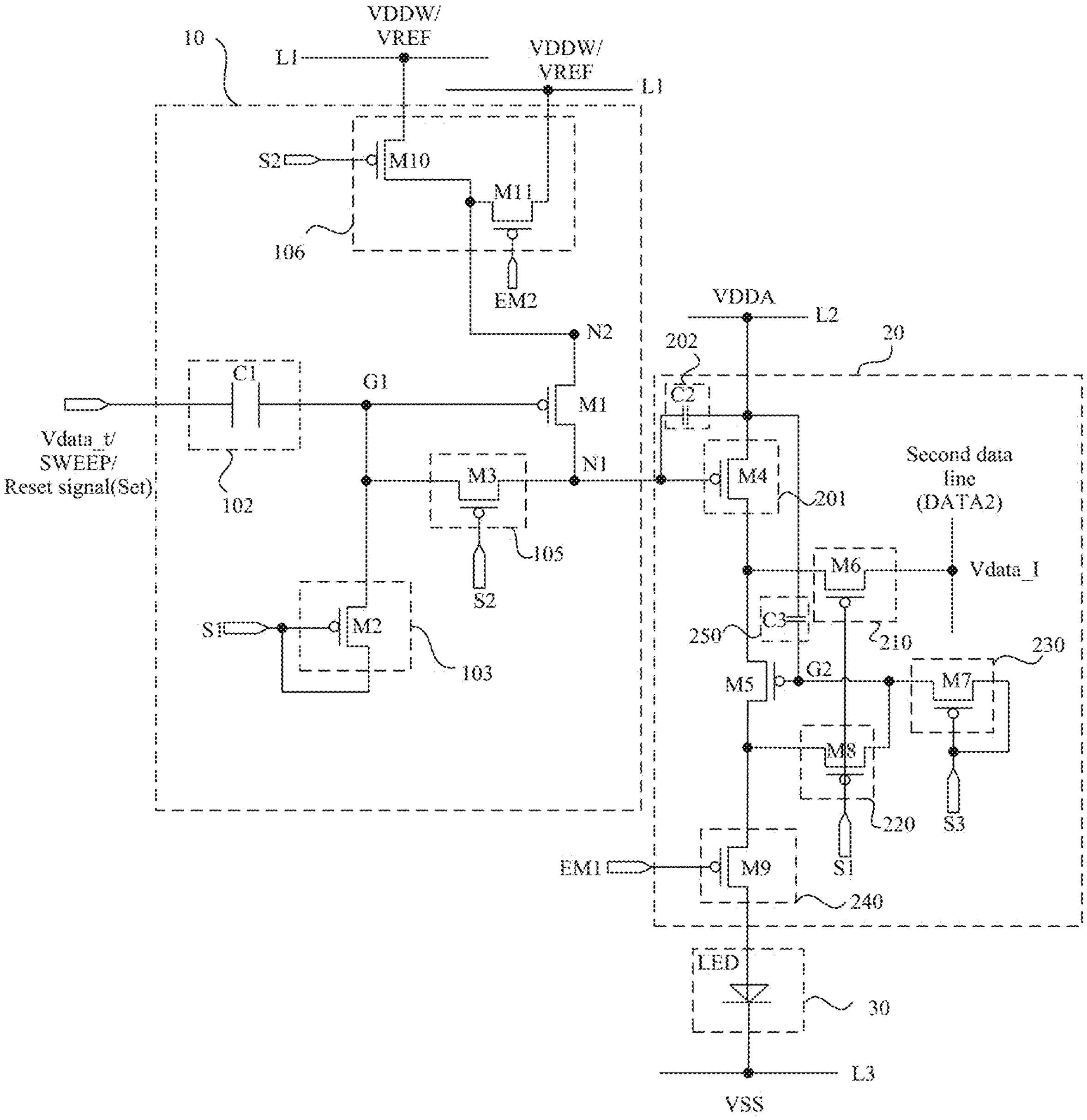
FIG. 25 is another structure diagram of a pixel circuit according to an embodiment of the present application.

FIG. 25 is another structure diagram of a pixel circuit according to an embodiment of the present application. Referring to FIG. 25, optionally, in this embodiment, the first scanning signal line also serves as the first initialization signal line, and the third scanning signal line also serves as the second initialization signal line. That is to say, the second transistor M2 and the seventh transistor M7 are diode-connected so that the number of first initialization signal lines and the number of second initialization signal lines can be reduced. Of course, in other embodiments, the first initialization signal line may also serve as the second initialization signal line, or the first scanning signal line may also serve as the third scanning signal line, that is, the same initialization voltage is input through the second transistor M2 and the seventh transistor M7. With the preceding related settings, the number of signal lines can be further reduced, and signal types can be simplified, facilitating the increase of the PPI. Based on the pixel circuit provided in FIG. 21 of the present application, in conjunction with the technical solution where the second transistor M2 and the seventh transistor M7 are diode-connected, the pixel circuit having a 9T3C structure can satisfy the display requirement of more than 160 PPI.

Figure 26:
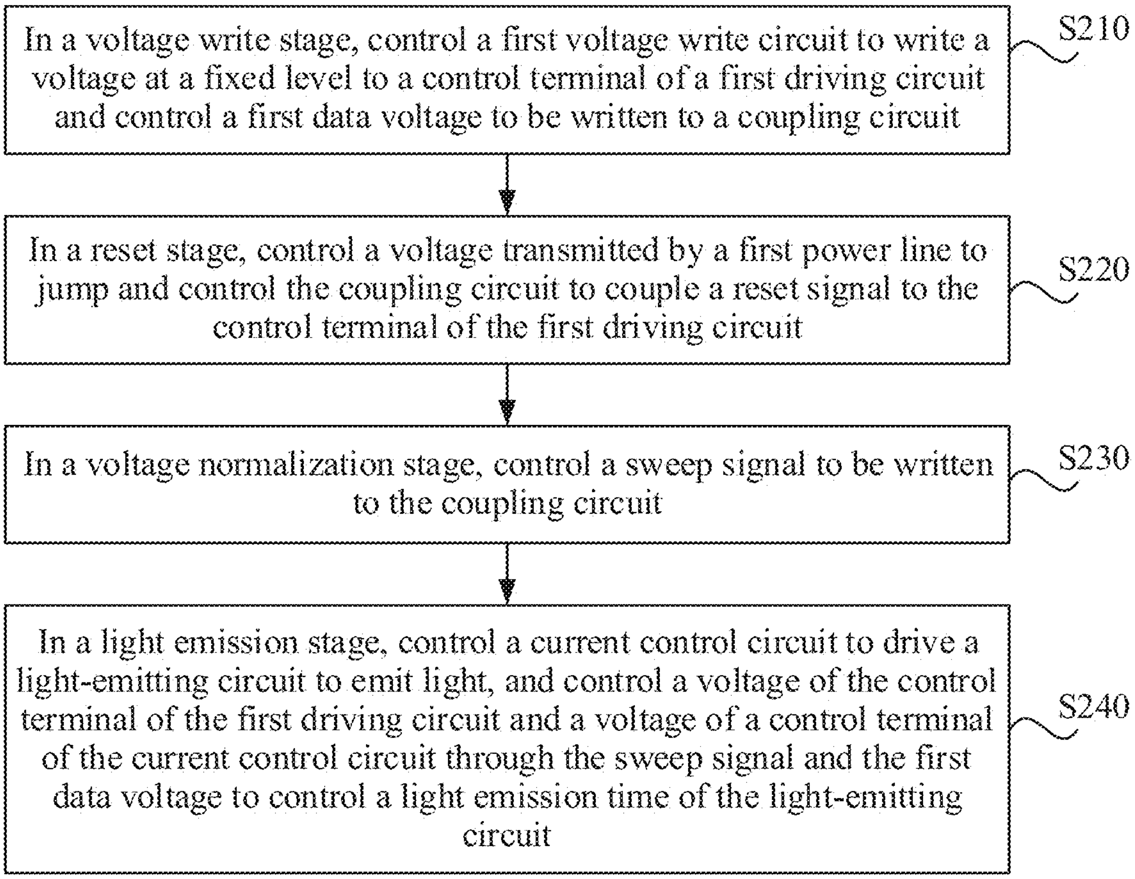
FIG. 26 is another flowchart of a driving method for a pixel circuit according to an embodiment of the present application.

Optionally, the present application further provides a driving method for a pixel circuit, where the pixel circuit according to any embodiment of the present application can be driven by the driving method. In conjunction with FIG. 18, the pixel circuit includes a voltage control circuit 10, a current control circuit 20 and a light-emitting circuit 30. The voltage control circuit 10 includes a first driving circuit 101, a coupling circuit 102 and a first voltage write circuit 103. The first driving circuit 101 is connected between a first power line L1 and a control terminal of the current control circuit 20. The current control circuit 20 and the light-emitting circuit 30 are connected between a second power line L2 and a third power line L3. The coupling circuit 102 is connected to a control terminal G1 of the first driving circuit 101. FIG. 26 is another flowchart of a driving method for a pixel circuit according to an embodiment of the present application. Referring to FIG. 26, the driving method for the pixel circuit includes S210 to S240.

In S210, in a voltage write stage, the first voltage write circuit is controlled to write a voltage at a fixed level to the control terminal of the first driving circuit and a first data voltage is controlled to be written to the coupling circuit.

In S220, in a reset stage, a voltage transmitted by the first power line is controlled to jump, and the coupling circuit is controlled to couple a reset signal to the control terminal of the first driving circuit.

In S230, in a voltage normalization stage, a sweep signal is controlled to be written to the coupling circuit.

In S240, in a light emission stage, the current control circuit is controlled to drive the light-emitting circuit to emit light, and a voltage of the control terminal of the first driving circuit and a voltage of the control terminal of the current control circuit are controlled through the sweep signal and the first data voltage to control a light emission time of the light-emitting circuit.

According to the technical solutions provided in this embodiment, the current control circuit generates a driving current to drive the light-emitting circuit to emit light, and the first driving circuit controls the voltage of the control terminal of the current control circuit to control the period in which the current control circuit is turned on to control the light emission time of the light-emitting circuit. In this embodiment, power voltages connected to the voltage control circuit and the current control circuit are distinguished, and a power voltage transmitted by the first power line connected to the voltage control circuit is configured to be a jump voltage. In the reset stage, the voltage transmitted by the first power line jumps from a first power voltage to a reset voltage, and the coupling circuit couples the reset signal to the control terminal of the first driving circuit to control the first driving circuit to be turned on so that the reset voltage is transmitted to the control terminal of the current control circuit, thereby resetting a control potential of the current control circuit. Compared with a solution where a separate reset circuit is configured to reset the control terminal of the current control circuit, the technical solutions provided in this embodiment have no need to dispose the reset circuit and a reset voltage signal line so that the structure of the pixel circuit can be simplified and the number of signal lines can be reduced, facilitating the increase of the PPI.

Optionally, the first power line L1 is configured to transmit a voltage that jumps from a first power voltage VDDW to a reset voltage VREF at least in the reset stage and jumps from the reset voltage VREF to the first power voltage VDDW after the reset stage. Referring to FIG. 21, the first voltage write circuit 103 is connected between a first initialization signal line and the control terminal G1 of the first driving circuit 101, and a control terminal of the first voltage write circuit 103 is connected to a first scanning signal line. The voltage control circuit 10 further includes a first compensation circuit 105, the first compensation circuit 105 is connected between a first terminal N1 of the first driving circuit 101 and the control terminal G1 of the first driving circuit 101, and a control terminal of the first compensation circuit 105 is connected to a second scanning signal line. The current control circuit 20 includes a first light emission control circuit 201 and a first storage circuit 202. A control terminal of the first light emission control circuit 201 serves as the control terminal of the current control circuit 20 and is connected to the first terminal of the first driving circuit 101. The first storage circuit 202 is connected to the control terminal of the first light emission control circuit 201. The current control circuit 20 includes a second driving circuit 203, a second voltage write circuit 204, a second storage circuit 205, an initialization circuit 206, a second light emission control circuit 208 and a second compensation circuit 207. The first light emission control circuit 201 is connected between the second power line L2 and a first terminal of the second driving circuit 203. A control terminal of the second voltage write circuit 204 and a control terminal of the second compensation circuit 207 are connected to the first scanning signal line, the second voltage write circuit 204 is connected between a second data line DATA2 and the first terminal of the second driving circuit 203, and the second compensation circuit 207 is connected between a control terminal G2 of the second driving circuit 203 and a second terminal of the second driving circuit 203. The initialization circuit 206 is connected between a second initialization signal line and the control terminal G2 of the second driving circuit 203, and a control terminal of the initialization circuit 206 is connected to a third scanning signal line. A control terminal of the second light emission control circuit 208 is connected to a first light emission control signal line, and the second light emission control circuit 208 is connected between the second terminal of the second driving circuit 203 and the light-emitting circuit 30.

Figure 27:
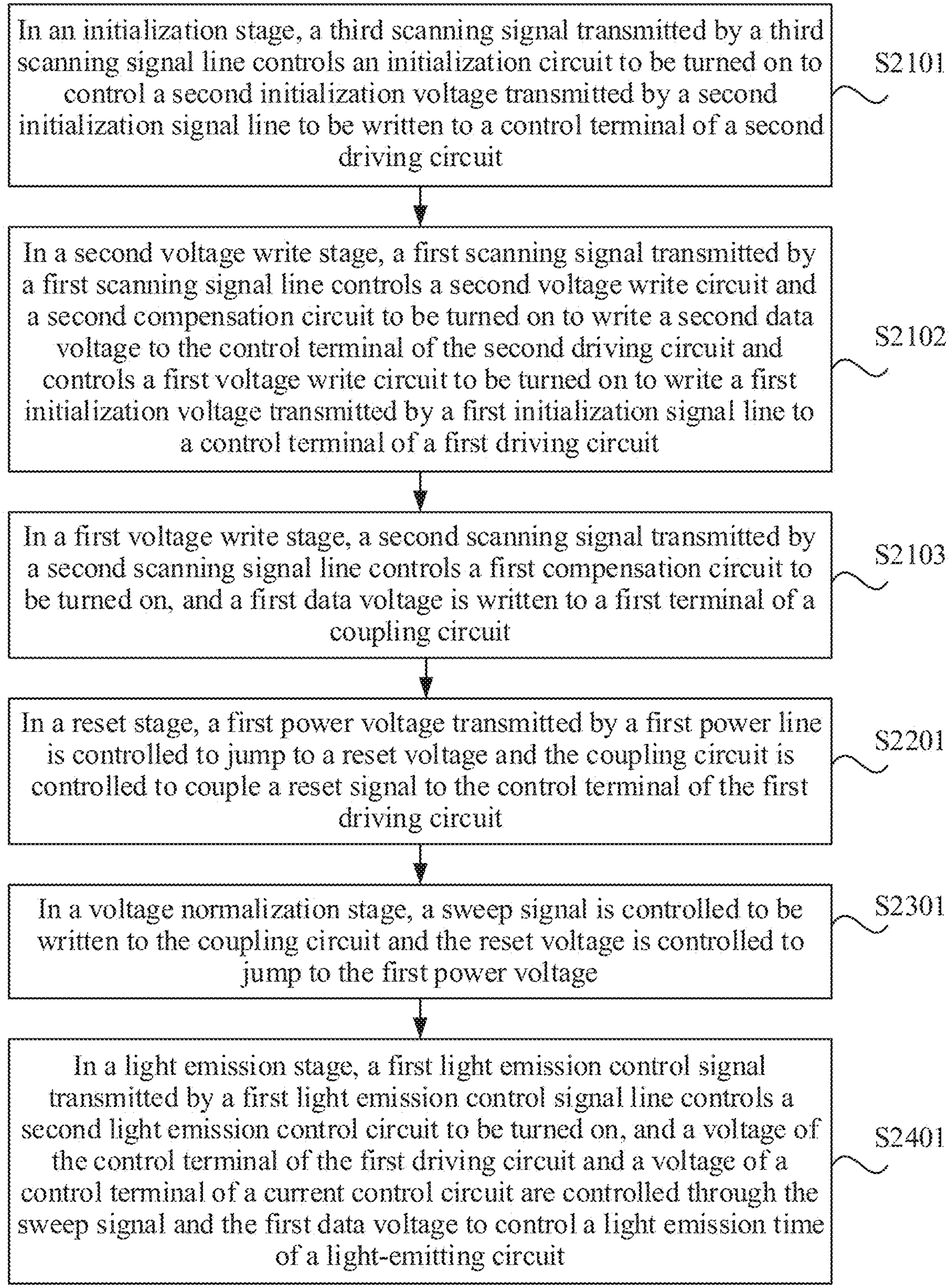
FIG. 27 is another flowchart of a driving method for a pixel circuit according to an embodiment of the present application.

The voltage write stage includes an initialization stage, a first voltage write stage and a second voltage write stage. FIG. 27 is another flowchart of a driving method for a pixel circuit according to an embodiment of the present application. Referring to FIG. 27, the driving method for the pixel circuit includes S2101 to S2401.

In S2101, in the initialization stage, a third scanning signal transmitted by the third scanning signal line controls the initialization circuit to be turned on to control a second initialization voltage transmitted by the second initialization signal line to be written to the control terminal of the second driving circuit.

In S2102, in the second voltage write stage, a first scanning signal transmitted by the first scanning signal line controls the second voltage write circuit and the second compensation circuit to be turned on to write a second data voltage to the control terminal of the second driving circuit and controls the first voltage write circuit to be turned on to write a first initialization voltage transmitted by the first initialization signal line to the control terminal of the first driving circuit.

In S2103, in the first voltage write stage, a second scanning signal transmitted by the second scanning signal line controls the first compensation circuit to be turned on, and the first data voltage is written to a first terminal of the coupling circuit.

In S2201, in the reset stage, the first power voltage transmitted by the first power line is controlled to jump to the reset voltage, and the coupling circuit is controlled to couple the reset signal to the control terminal of the first driving circuit.

In S2301, in the voltage normalization stage, the sweep signal is controlled to be written to the coupling circuit, and the reset voltage is controlled to jump to the first power voltage.

In S2401, in the light emission stage, a first light emission control signal transmitted by the first light emission control signal line controls the second light emission control circuit to be turned on, and the voltage of the control terminal of the first driving circuit and the voltage of the control terminal of the current control circuit are controlled through the sweep signal and the first data voltage to control the light emission time of the light-emitting circuit.

For example, the driving method for the pixel circuit shown in FIG. 27 is applicable to the pixel circuit shown in FIG. 21. For the specific working principle, refer to the related description in the preceding multiple embodiments. The driving method also has the effects described in the preceding multiple embodiments. The details are not repeated here.

Figure 28:
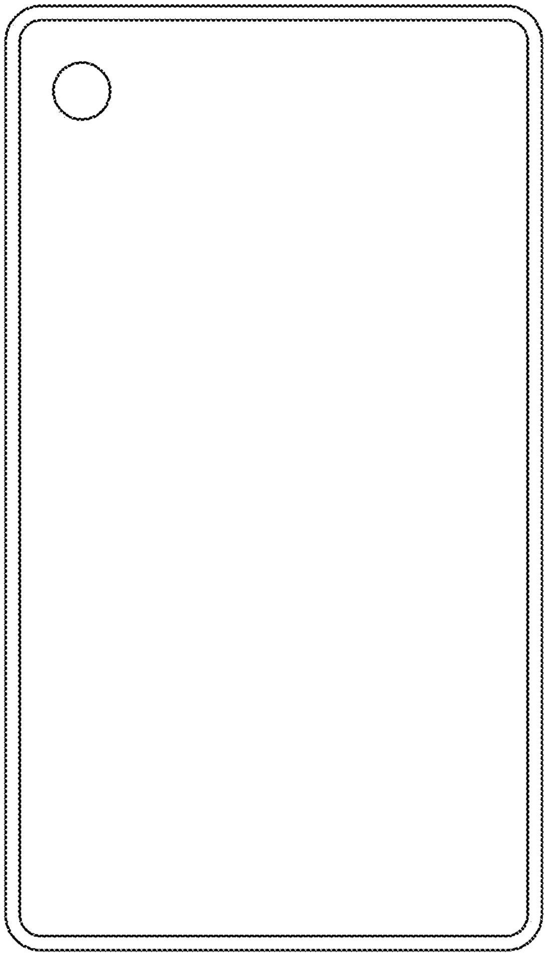
FIG. 28 is a structure diagram of a display device according to an embodiment of the present application.

Optionally, an embodiment of the present application provides a display device. The display device includes the pixel circuit according to any embodiment of the present application. FIG. 28 is a structure diagram of a display device according to an embodiment of the present application. The display device may be the cellphone shown in FIG. 28 or may be a tablet, a mobile phone, a watch, a wearable device or an electronic device such as an in-vehicle display, a camera display, a television or a computer screen. The display device includes the pixel circuit of any embodiment of the present application; therefore, the display device of this embodiment of the present application has the effects described in any embodiment of the present application.

It is to be understood that various forms of the preceding flows may be adopted with steps reordered, added or deleted. For example, the steps described in the present application may be performed in parallel, in sequence or in a different sequence as long as the desired results of the technical solutions of the present application can be achieved. The execution sequence of the steps is not limited herein.

What is claimed is:

1. A pixel circuit, comprising:

a voltage control circuit comprising:

a first driving circuit, a coupling circuit, and a first voltage write circuit, wherein the first voltage write circuit is configured to transmit a voltage at a fixed level to a control terminal of the first driving circuit, the coupling circuit is configured to couple a first data voltage and a sweep signal to the control terminal of the first driving circuit, the first driving circuit is connected between a first power line and a control terminal of a current control circuit, a voltage transmitted by the first power line is a jump voltage, and the first driving circuit is configured to control a voltage of the control terminal of the current control circuit according to the first data voltage and the sweep signal to control a light emission time of a light-emitting circuit; and the current control circuit, and the light-emitting circuit, wherein the current control circuit and the light-emitting circuit are connected between a second power line and a third power line, and the current control circuit is configured to drive the light-emitting circuit to emit light;

the current control circuit comprises a first light emission control circuit and a second driving circuit, a first terminal of the first light emission control circuit is connected to a second power voltage transmitted by the second power line, a second terminal of the first light emission control circuit is connected to a first terminal of the second driving circuit, and a second terminal of the second driving circuit is connected to the light-emitting circuit;

wherein the voltage control circuit further comprises a reset circuit, and the reset circuit is connected between the first power line and the control terminal of the current control circuit and configured to reset the voltage of the control terminal of the current control circuit; or the coupling circuit is further configured to couple a reset signal to the control terminal of the first driving circuit to reset the voltage of the control terminal of the current control circuit.

2. The pixel circuit according to claim 1, wherein an operating process of the pixel circuit comprises at least a voltage write stage, a reset stage and a voltage normalization stage, and the reset stage is positioned after the voltage write stage and before the voltage normalization stage; and the first power line is configured to transmit a voltage that jumps from a first power voltage to a reset voltage at least in the reset stage and jumps from the reset voltage to the first power voltage after the reset stage.

3. The pixel circuit according to claim 2, wherein in response to the voltage control circuit further comprising the reset circuit, the reset circuit is configured to transmit the reset voltage to the control terminal of the current control circuit in the reset stage; and in response to the coupling circuit being further configured to couple the reset signal to the control terminal of the first driving circuit, the coupling circuit is configured to couple the reset signal to the control terminal of the first driving circuit in the following manner: in the reset stage, the reset signal is coupled to the control terminal of the first driving circuit so that the reset voltage is transmitted to the control terminal of the current control circuit.

4. The pixel circuit according to claim 3, wherein the voltage control circuit further comprises a first compensation circuit, a first terminal of the first compensation circuit is connected to a first terminal of the first driving circuit, a second terminal of the first compensation circuit is connected to the control terminal of the first driving circuit, and the first compensation circuit is configured to perform compensation on a threshold voltage of the first driving circuit in the voltage write stage; and a first terminal of the first voltage write circuit is connected to a first initialization signal line, a second terminal of the first voltage write circuit is connected to the control terminal of the first driving circuit, and the first voltage write circuit is configured to write a first initialization voltage transmitted by the first initialization signal line to the control terminal of the first driving circuit.

5. The pixel circuit according to claim 3, wherein a minimum voltage of the reset voltage is lower than a minimum voltage of the first data voltage.

6. The pixel circuit according to claim 1, wherein in response to the voltage control circuit further comprising the reset circuit, a first terminal of the first voltage write circuit is connected to the first power line, a second terminal of the first voltage write circuit is connected to the control terminal of the first driving circuit, and the first voltage write circuit is configured to write a first power voltage transmitted by the first power line to the control terminal of the first driving circuit.

7. The pixel circuit according to claim 1, wherein a first terminal of the coupling circuit is configured to input the first data voltage and the sweep signal, and a second terminal of the coupling circuit is connected to the control terminal of the first driving circuit; and in response to the coupling circuit being further configured to couple the reset signal to the control terminal of the first driving circuit, the first terminal of the coupling circuit is further configured to input the reset signal.

8. The pixel circuit according to claim 1, wherein the current control circuit comprises:

a first storage circuit, a control terminal of the first light emission control circuit serves as the control terminal of the current control circuit and is connected to a first terminal of the first driving circuit, and the first storage circuit is connected to the control terminal of the first light emission control circuit;

the current control circuit further comprises:

a second voltage write circuit, a second storage circuit, and a second light emission control circuit, wherein the second terminal of the second driving circuit is connected to the light-emitting circuit through the second light emission control circuit; and the second voltage write circuit is configured to write a second data voltage transmitted by a second data line to a control terminal of the second driving circuit, and the second storage circuit is connected to the control terminal of the second driving circuit.

9. The pixel circuit according to claim 8, wherein the current control circuit further comprises an initialization circuit, and the initialization circuit is configured to write a second initialization voltage transmitted by a second initialization signal line to the control terminal of the second driving circuit.

10. The pixel circuit according to claim 9, wherein the current control circuit further comprises a second compensation circuit, and the second compensation circuit is connected between the control terminal of the second driving circuit and the second terminal of the second driving circuit.

11. The pixel circuit according to claim 10, wherein the light-emitting circuit comprises a light-emitting diode, the first driving circuit comprises a first transistor, the first voltage write circuit comprises a second transistor, the first light emission control circuit comprises a fourth transistor, the second driving circuit comprises a fifth transistor, the second voltage write circuit comprises a sixth transistor, the initialization circuit comprises a seventh transistor, the second compensation circuit comprises an eighth transistor, the second light emission control circuit comprises a ninth transistor, the first storage circuit comprises a second capacitor, and the second storage circuit comprises a third capacitor;

a first electrode of the first transistor is connected to the first power line, a second electrode of the first transistor is connected to a gate of the fourth transistor, a gate of the first transistor is connected to the coupling circuit, a gate of the second transistor is connected to a first scanning signal line, a first electrode of the second transistor is connected to a first initialization signal line, and a second electrode of the second transistor is connected to the gate of the first transistor;

the gate of the fourth transistor is connected to the first terminal of the first driving circuit, a first electrode of the fourth transistor is connected to the second power line, a second electrode of the fourth transistor is connected to a first electrode of the fifth transistor, a second electrode of the fifth transistor is connected to a first electrode of the ninth transistor, a second electrode of the ninth transistor is connected to a first electrode of the light-emitting diode, a second electrode of the light-emitting diode is connected to the third power line, and a gate of the ninth transistor is connected to a first light emission control signal line;

a gate of the sixth transistor and a gate of the eighth transistor are connected to the first scanning signal line, a first electrode of the sixth transistor is connected to the second data line, a second electrode of the sixth transistor is connected to the first electrode of the fifth transistor, a first electrode of the eighth transistor is connected to a gate of the fifth transistor, a second electrode of the eighth transistor is connected to the second electrode of the fifth transistor, a gate of the seventh transistor is connected to a third scanning signal line, a first electrode of the seventh transistor is connected to the second initialization signal line, and a second electrode of the seventh transistor is connected to the gate of the fifth transistor; and a first electrode of the second capacitor and a first electrode of the third capacitor are connected to the first electrode of the fourth transistor, a second electrode of the second capacitor is connected to the gate of the fourth transistor, and a second electrode of the third capacitor is connected to the gate of the fifth transistor.

12. The pixel circuit according to claim 11, wherein in response to the coupling circuit being further configured to couple the reset signal to the control terminal of the first driving circuit, the first scanning signal line, the third scanning signal line and the first light emission control signal line are configured to transmit drive signals to satisfy the following:

in a voltage write stage, the seventh transistor is turned on, and then the second transistor, the sixth transistor and the eighth transistor are turned on; in a reset stage, the first transistor and the fourth transistor are turned on; and in a light emission stage, the ninth transistor is turned on.

13. The pixel circuit according to claim 11, wherein the pixel circuit satisfies at least one of the following:

the first scanning signal line also serves as the first initialization signal line, and the third scanning signal line also serves as the second initialization signal line; or the first initialization signal line also serves as the second initialization signal line.

14. The pixel circuit according to claim 10, wherein the reset circuit comprises a twelfth transistor, a gate of the twelfth transistor is connected to a reset signal line, a first electrode of the twelfth transistor is connected to a first electrode of a first transistor, and a second electrode of the twelfth transistor is connected to the control terminal of the current control circuit.

15. The pixel circuit according to claim 1, further comprising:

a third voltage write circuit, wherein the third voltage write circuit is connected between the first power line and a second terminal of the first driving circuit, and the third voltage write circuit is configured to transmit the voltage transmitted by the first power line to the second terminal of the first driving circuit.

16. The pixel circuit according to claim 15, wherein the reset circuit is connected between the second terminal of the first driving circuit and a first terminal of the first driving circuit.

17. A driving method for a pixel circuit, wherein the pixel circuit comprises a voltage control circuit, a current control circuit and a light-emitting circuit; the voltage control circuit comprises a first driving circuit, a coupling circuit and a first voltage write circuit; or the voltage control circuit comprises a first driving circuit, a coupling circuit, a first voltage write circuit and a reset circuit, and the reset circuit is connected between a first power line and a control terminal of the current control circuit; the coupling circuit and the first voltage write circuit are connected to a control terminal of the first driving circuit, the first driving circuit is connected between the first power line and the control terminal of the current control circuit, and a voltage transmitted by the first power line is a jump voltage; and the current control circuit and the light-emitting circuit are connected between a second power line and a third power line; the driving method for the pixel circuit comprises:

in a voltage write stage, controlling the first voltage write circuit to write a voltage at a fixed level to the control terminal of the first driving circuit and controlling a first data voltage to be written to the coupling circuit;

in a reset stage, controlling the voltage transmitted by the first power line to jump and controlling the reset circuit to reset a voltage of the control terminal of the current control circuit, or controlling the voltage transmitted by the first power line to jump and controlling the coupling circuit to couple a reset signal to the control terminal of the first driving circuit to reset a voltage of the control terminal of the current control circuit;

in a voltage normalization stage, controlling a sweep signal to be written to the coupling circuit so that the coupling circuit couples the first data voltage to the control terminal of the first driving circuit; and in a light emission stage, controlling the current control circuit to drive the light-emitting circuit to emit light and controlling a voltage of the control terminal of the first driving circuit and the voltage of the control terminal of the current control circuit through the sweep signal and the first data voltage to control a light emission time of the light-emitting circuit.

18. The driving method for the pixel circuit according to claim 17, wherein the first voltage write circuit is connected between a first initialization signal line and the control terminal of the first driving circuit, and a control terminal of the first voltage write circuit is connected to a first scanning signal line; the voltage control circuit further comprises a first compensation circuit, the first compensation circuit is connected between a first terminal of the first driving circuit and the control terminal of the first driving circuit, and a control terminal of the first compensation circuit is connected to a second scanning signal line; the current control circuit comprises a first light emission control circuit, a first storage circuit, a second driving circuit, a second voltage write circuit, a second storage circuit, an initialization circuit, a second compensation circuit and a second light emission control circuit; a control terminal of the first light emission control circuit serves as the control terminal of the current control circuit and is connected to the first terminal of the first driving circuit, the first storage circuit is connected to the control terminal of the first light emission control circuit, and the first light emission control circuit is connected between the second power line and a first terminal of the second driving circuit; a control terminal of the second voltage write circuit and a control terminal of the second compensation circuit are connected to the first scanning signal line, the second voltage write circuit is connected between a second data line and the first terminal of the second driving circuit, and the second compensation circuit is connected between a control terminal of the second driving circuit and a second terminal of the second driving circuit; the initialization circuit is connected between a second initialization signal line and the control terminal of the second driving circuit, and a control terminal of the initialization circuit is connected to a third scanning signal line; a control terminal of the second light emission control circuit is connected to a first light emission control signal line, and the second light emission control circuit is connected between the second terminal of the second driving circuit and the light-emitting circuit; and in response to the voltage control circuit comprising the first driving circuit, the coupling circuit, the first voltage write circuit and the reset circuit, a control terminal of the reset circuit is connected to a reset signal line;

the voltage write stage comprises an initialization stage, a first voltage write stage and a second voltage write stage;

in the initialization stage, a third scanning signal transmitted by the third scanning signal line controls the initialization circuit to be turned on;

in the second voltage write stage, a first scanning signal transmitted by the first scanning signal line controls the second voltage write circuit, the second compensation circuit and the first voltage write circuit to be turned on;

in the first voltage write stage, a second scanning signal transmitted by the second scanning signal line controls the first compensation circuit to be turned on, and the first data voltage is written to a first terminal of the coupling circuit;

in the reset stage, the reset signal transmitted by the reset signal line connected to the reset circuit controls the reset circuit to be turned on, or in the reset stage, the coupling circuit is controlled to couple the reset signal to the control terminal of the first driving circuit to control the first driving circuit and the first light emission control circuit to be turned on; and in the light emission stage, a first light emission control signal transmitted by the first light emission control signal line controls the second light emission control circuit to be turned on.

19. The driving method for the pixel circuit according to claim 17, wherein in the reset stage, controlling the voltage transmitted by the first power line to jump and controlling the reset circuit to reset the voltage of the control terminal of the current control circuit comprise:

in the reset stage, controlling the voltage transmitted by the first power line to jump from a first power voltage to a reset voltage and controlling the reset circuit to write the reset voltage to the control terminal of the current control circuit;

in the reset stage, controlling the voltage transmitted by the first power line to jump and controlling the coupling circuit to couple the reset signal to the control terminal of the first driving circuit comprise:

in the reset stage, controlling the first power voltage transmitted by the first power line to jump to the reset voltage and controlling the coupling circuit to couple the reset signal to the control terminal of the first driving circuit; and in the voltage normalization stage, the sweep signal is written to the coupling circuit and the reset voltage is controlled to jump to the first power voltage.

20. A display device, comprising a pixel circuit, wherein the pixel circuit comprises:

a voltage control circuit comprising:

a first driving circuit, a coupling circuit, and a first voltage write circuit, wherein the first voltage write circuit is configured to transmit a voltage at a fixed level to a control terminal of the first driving circuit, the coupling circuit is configured to couple a first data voltage and a sweep signal to the control terminal of the first driving circuit, the first driving circuit is connected between a first power line and a control terminal of a current control circuit, a voltage transmitted by the first power line is a jump voltage, and the first driving circuit is configured to control a voltage of the control terminal of the current control circuit according to the first data voltage and the sweep signal to control a light emission time of a light-emitting circuit; and the current control circuit, and the light-emitting circuit, wherein the current control circuit and the light-emitting circuit are connected between a second power line and a third power line, and the current control circuit is configured to drive the light-emitting circuit to emit light;

the current control circuit comprises a first light emission control circuit and a second driving circuit, a first terminal of the first light emission control circuit is connected to a second power voltage transmitted by the second power line, a second terminal of the first light emission control circuit is connected to a first terminal of the second driving circuit, and a second terminal of the second driving circuit is connected to the light-emitting circuit;

wherein the voltage control circuit further comprises:

a reset circuit, and the reset circuit is connected between the first power line and the control terminal of the current control circuit and configured to reset the voltage of the control terminal of the current control circuit; or the coupling circuit is further configured to couple a reset signal to the control terminal of the first driving circuit to reset the voltage of the control terminal of the current control circuit.

* * * * *